(12) United States Patent
Kakutani

(10) Patent No.: US 7,929,183 B2
(45) Date of Patent: Apr. 19, 2011

(54) IMAGE OUTPUT CONTROL SYSTEM, IMAGE PROCESSING DEVICE, AND IMAGE PROCESSING METHOD

(75) Inventor: Toshiaki Kakutani, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1065 days.

(21) Appl. No.: 10/550,900

(22) PCT Filed: Mar. 29, 2004

(86) PCT No.: PCT/JP2004/004474
§ 371 (c)(1),
(2), (4) Date: Mar. 19, 2007

(87) PCT Pub. No.: WO2004/086749
PCT Pub. Date: Oct. 7, 2004

(65) Prior Publication Data
US 2007/0188777 A1    Aug. 16, 2007

(30) Foreign Application Priority Data

Mar. 27, 2003    (JP) .................................. 2003-087190

(51) Int. Cl.
H04N 1/405    (2006.01)
G06K 15/00    (2006.01)
H04N 1/40    (2006.01)

(52) U.S. Cl. ..................... 358/3.16; 358/3.01; 358/3.14; 358/3.21; 358/3.22; 358/3.24

(58) Field of Classification Search ................... 358/1.1, 358/1.9, 3.01, 3.06, 3.1, 3.13, 3.2, 3.23, 3.26; 382/234, 237, 254, 270, 272
See application file for complete search history.

(56) References Cited

U.S. PATENT DOCUMENTS
4,837,846 A    6/1989    Oyabu et al.
(Continued)

FOREIGN PATENT DOCUMENTS
EP    0 564 868    10/1993
(Continued)

OTHER PUBLICATIONS
Abstract of Japanese Patent Publication No. 62-176371, Pub. Date: Aug. 3, 1987, Patent Abstracts of Japan.
(Continued)

Primary Examiner — James A Thompson

(57) ABSTRACT

In an image output control system of the invention, an image processing device makes image data subjected to a preset series of image processing and supplies processed image data to an image output device to output a resulting processed image. The image processing device collects a predetermined number of plural pixels among a large number of pixels constituting the image to one pixel group, specifies number of dots to be created in the pixel group, and outputs dot number data representing the specified number of dots to be created in the pixel group to the image output device. The image output device stores multiple priority orders of pixels for dot formation in each pixel group. The image output device receives the output dot number data, selects one priority order among the stored multiple priority orders, determines position of each dot-on pixel in each pixel group, and actually creates a dot at the determined position of each dot-on pixel, so as to output a resulting image. In the image output control system of the invention, the image processing device supplies the dot number data to the image output device. Even when an image includes a large number of pixels, this arrangement ensures quick data supply and thereby high-speed image output.

18 Claims, 34 Drawing Sheets

U.S. PATENT DOCUMENTS

| | | | |
|---|---|---|---|
| 5,073,966 A * | 12/1991 | Sato | 382/237 |
| 5,124,803 A | 6/1992 | Troxel | |
| 6,831,756 B1 | 12/2004 | Ushiroda | |

FOREIGN PATENT DOCUMENTS

| | | |
|---|---|---|
| EP | 0 794 655 | 9/1997 |
| JP | 62-176371 | 8/1987 |
| JP | 63-182973 | 7/1988 |
| JP | 03-159372 | 7/1991 |
| JP | 05-292273 | 11/1993 |
| JP | 05-292297 | 11/1993 |
| JP | 06-152986 | 5/1994 |
| JP | 08-065511 | 3/1996 |
| JP | 08-116440 | 5/1996 |
| JP | 08-130640 | 5/1996 |
| JP | 09-130597 | 5/1997 |
| JP | 2000-071439 | 3/2000 |
| JP | 2000-115716 | 4/2000 |
| JP | 2000-350022 | 12/2000 |
| JP | 2002-262089 | 9/2002 |
| JP | 2002-271623 | 9/2002 |
| JP | 3374551 | 11/2002 |

OTHER PUBLICATIONS

Abstract of Japanese Patent Publication No. 63-182973, Pub. Date: Jul. 28, 1988, Patent Abstracts of Japan.

Abstract of Japanese Patent Publication No. 03-159372, Pub. Date: Jul. 9, 1991, Patent Abstracts of Japan.

Abstract of Japanese Patent Publication No. 05-292273, Pub. Date: Nov. 5, 1993, Patent Abstracts of Japan.

Abstract of Japanese Patent Publication No. 05-292297, Pub. Date: Nov. 5, 1993, Patent Abstracts of Japan.

Abstract of Japanese Patent Publication No. 06-152986, Pub. Date: May 31, 1994, Patent Abstracts of Japan.

Abstract of Japanese Patent Publication No. 08-065511, Pub. Date: Mar. 8, 1996, Patent Abstracts of Japan.

Abstract of Japanese Patent Publication No. 08-116440, Pub. Date: May 7, 1996, Patent Abstracts of Japan.

Abstract of Japanese Patent Publication No. 08-130640, Pub. Date: May 21, 1996, Patent Abstracts of Japan.

Abstract of Japanese Patent Publication No. 09-130597, Pub. Date: May 16, 1997, Patent Abstracts of Japan.

Abstract of Japanese Patent Publication No. 2000-071439, Pub. Date: Mar. 7, 2000, Patent Abstracts of Japan.

Abstract of Japanese Patent Publication No. 2002-262089, Pub. Date: Sep. 13, 2002, Patent Abstracts of Japan.

Abstract of Japanese Patent Publication No. 8-130640, Pub. Date: May 21, 1996, Patent Abstracts of Japan.

Abstract of Japanese Patent Publication No. 2000-115716, Pub. Date: Apr. 21, 2000, Patent Abstracts of Japan.

Abstract of Japanese Patent Publication No. 2000-350022, Pub. Date: Dec. 15, 2000, Patent Abstracts of Japan.

Abstract of Japanese Patent Publication No. 2002-271623, Pub. Date: Sep. 20, 2002, Patent Abstracts of Japan.

* cited by examiner

Fig.6(a)

| 97 | 102 | 104 |
|----|-----|-----|
| 94 | 99  | 101 |
| 92 | 96  | 99  |

Fig.6(b)

| 97 | 97 | 97 | 97 | 102 | 102 | 102 | 102 | 104 | 104 | 104 | 104 |
|----|----|----|----|-----|-----|-----|-----|-----|-----|-----|-----|
| 97 | 97 | 97 | 97 | 102 | 102 | 102 | 102 | 104 | 104 | 104 | 104 |
| 94 | 94 | 94 | 94 | 99  | 99  | 99  | 99  | 101 | 101 | 101 | 101 |
| 94 | 94 | 94 | 94 | 99  | 99  | 99  | 99  | 101 | 101 | 101 | 101 |
| 92 | 92 | 92 | 92 | 96  | 96  | 96  | 96  | 99  | 99  | 99  | 99  |
| 92 | 92 | 92 | 92 | 96  | 96  | 96  | 96  | 99  | 99  | 99  | 99  |

Fig.8

64 Pixels →

↓ 64 Pixels

| 1 | 177 | 58 | 170 | 70 | 186 | 79 | 161 | 94 | 171 | 16 | 164 | 24 | 158 | 227 | 6 | 133 | 157 |
|---|---|---|---|---|---|---|---|---|---|---|---|---|---|---|---|---|---|
| 255 | 109 | 212 | 42 | 242 | 5 | 223 | 48 | 209 | 67 | 248 | 81 | 234 | 132 | 56 | 120 | 253 | |
| 123 | 33 | 127 | 181 | 83 | 155 | 105 | 140 | 30 | 150 | 119 | 182 | 40 | 89 | 220 | 163 | 44 | |
| 219 | 91 | 237 | 22 | 121 | 198 | 61 | 188 | 111 | 215 | 3 | 98 | 201 | 140 | 10 | 95 | | |
| 11 | 195 | 53 | 136 | 227 | 37 | 247 | 12 | 233 | 52 | 192 | 135 | 32 | 246 | 113 | 194 | | |
| 99 | 144 | 107 | 184 | 68 | 172 | 97 | 151 | 77 | 173 | 84 | 237 | 123 | 61 | 167 | 46 | | |
| 225 | 40 | 251 | 6 | 217 | 116 | 28 | 196 | 125 | 35 | 207 | 17 | 153 | 203 | 24 | | | |
| 87 | 169 | 78 | 162 | 59 | 146 | 211 | 64 | 254 | 142 | 72 | 178 | 87 | 118 | 228 | | | |
| 190 | 15 | 202 | 111 | 238 | 19 | 93 | 169 | 8 | 110 | 221 | 49 | 249 | 2 | 144 | | | |
| 74 | 246 | 134 | 43 | 174 | 128 | 230 | 50 | 216 | 154 | 26 | 168 | 79 | 184 | | | | |
| 176 | 30 | 98 | 219 | 86 | 34 | 139 | 195 | 101 | 56 | 241 | 127 | 213 | 37 | | | | |
| 69 | 148 | 196 | 2 | 159 | 247 | 89 | 11 | 136 | 185 | 92 | 14 | 108 | | | | | |
| 187 | 41 | 126 | 226 | 106 | 57 | 190 | 115 | 235 | 36 | 208 | 121 | 229 | | | | | |
| 81 | 214 | 92 | 53 | 145 | 204 | 27 | 166 | 74 | 157 | 82 | 165 | 31 | | | | | |
| 232 | 21 | 170 | 240 | 13 | 132 | 252 | 51 | 222 | 4 | 245 | 48 | | | | | | |
| 130 | 155 | 55 | 115 | 183 | 78 | 122 | 196 | 102 | 180 | 65 | 173 | | | | | | |
| 72 | 252 | 100 | 211 | 45 | 231 | 20 | 148 | 39 | 133 | 205 | | | | | | | |
| 202 | 32 | 179 | 5 | 163 | 95 | 191 | 86 | 239 | 111 | 29 | | | | | | | |
| 104 | 143 | 58 | 243 | 70 | 218 | 63 | 161 | 9 | 209 | | | | | | | | |
| 64 | 236 | 129 | 110 | 151 | 25 | 199 | 49 | 172 | 68 | | | | | | | | |
| 171 | 17 | 208 | 38 | 225 | 131 | 99 | 254 | 113 | | | | | | | | | |
| 80 | 191 | 87 | 174 | 76 | 189 | 13 | 143 | | | | | | | | | | |
| 247 | 35 | 152 | 2 | 248 | 55 | | | | | | | | | | | | |
| 140 | 108 | 197 | 127 | 96 | | | | | | | | | | | | | |
| 13 | 215 | 46 | 229 | | | | | | | | | | | | | | |
| 164 | 90 | 180 | | | | | | | | | | | | | | | |
| 52 | 253 | | | | | | | | | | | | | | | | |
| 205 | | | | | | | | | | | | | | | | | |

Fig.13(a)

| | | |
|---|---|---|
| 255,212,177,170, 109, 58, 42, 1 | 242,223,186,161, 79,70,48,5 | 248,209,171,164, 94,81,67,16 |
| 237,219,181,127, 123,91,33,22 | 198,188,155,140, 121,105,83,61 | 215,182,150,119, 111,98,30,3 |
| 195,184,144,136, 107,99,53,11 | 247,227,172,151, 97,68,37,12 | 237,233,192,173, 135,84,77,52 |

Fig.13(b)

| | | |
|---|---|---|
| 255,212,177,170, 109,[58, 42, 1] | 242,223,186,161, [79, 70, 48, 5] | 248,209,171,164, [94, 81, 67, 16] |
| 237,219,181,127, 123,[91, 33, 22] | 198,188,155,140, 121,105,[83, 61] | 215,182,150,119, 111,[98, 30, 3] |
| 195,184,144,136, 107,[99, 53, 11] | 247,227,172,151, 97,[68, 37, 12] | 237,233,192,173, 135,[84, 77, 52] |

Fig.13(c)

| | | |
|---|---|---|
| 3 | 4 | 4 |
| 3 | 2 | 3 |
| 2 | 3 | 3 |

Fig.16(a)

| 97 | 100 | 97 | 99 | 102 | 104 | 101 | 103 |
|----|-----|----|----|-----|-----|-----|-----|
| 98 | 99 | 100 | 98 | 103 | 102 | 104 | 101 |
| 94 | 96 | 95 | 93 | 99 | 102 | 129 | 130 |
| 93 | 95 | 94 | 94 | 101 | 100 | 132 | 131 |

Fig.16(b)

| 99 | 103 | | | |
|----|-----|---|---|---|
| 94 | 99 | 102 | 129 | 130 |
|    | 101 | 100 | 132 | 131 |

Fig.17(a)

| 4-Bit Data | (0~8)

Fig.17(b)

| 1 | 0 | 0 | 1 | 8-Bit Data |

Fig.17(c)

| ① | ② | ③ | ④ |
| ⑤ | ⑥ | ⑦ | ⑧ |

Fig.18 (a), (b)
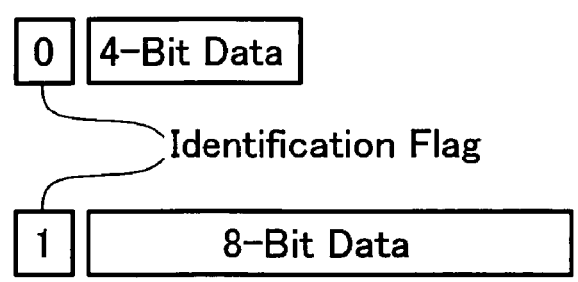

Fig.22(a)

| Data(L,M,S) =(2,90,32) | (0,90,40) | (0,85,50) |
|---|---|---|
| (0,92,28) | (5,80,32) | (10,50,32) |
| (5,85,52) | (15,60,43) | (20,70,32) |

Fig.22(b)

| Dot(L,M,S) = (1,2,1) | (0,4,0) | (0,3,1) |
|---|---|---|
| (0,3,0) | (0,2,1) | (1,1,0) |
| (0,2,3) | (1,2,1) | (0,3,0) |

Fig.25

| Dot Numbers | | | Code Number |
|---|---|---|---|
| Small-Size Dot | Medium-Size Dot | Large-Size Dot | |
| 0 | 0 | 0 | 0 |
| 1 | 0 | 0 | 1 |
| 2 | 0 | 0 | 2 |
| 3 | 0 | 0 | 3 |
| 0 | 2 | 6 | 160 |
| 0 | 0 | 7 | 161 |
| 1 | 0 | 7 | 162 |
| 0 | 1 | 7 | 163 |
| 0 | 0 | 8 | 164 |

Fig.29

|  | Dot Numbers (Threshold Value of Each Kind of Dot) | | |
|---|---|---|---|
| Code Number | Large-Size Dot (THL) | Large-Size Dot + Medium-Size Dot (THm) | Large-Size Dot + Medium-Size Dot + Small-Size Dot (THs) |
| 0 | 0 | 0 | 0 |
| 1 | 0 | 0 | 1 |
| 2 | 0 | 0 | 2 |
| 3 | 0 | 0 | 3 |
| 160 | 6 | 8 | 8 |
| 161 | 7 | 7 | 7 |
| 162 | 7 | 7 | 8 |
| 163 | 7 | 8 | 8 |
| 164 | 8 | 8 | 8 |

IMAGE OUTPUT CONTROL SYSTEM, IMAGE PROCESSING DEVICE, AND IMAGE PROCESSING METHOD

TECHNICAL FIELD

The present invention relates to a technique of making image data subjected to a preset series of image processing and outputting a processed image. More specifically the invention pertains to a technique of quickly transferring processed image data to an image output device, so as to attain high-speed image output.

BACKGROUND ART

Image output devices that create dots on various output media, for example, printing media and liquid crystal screens, to express an image are widely used as the output device of diverse imaging equipment. The image output device divides an image into a number of small elements called pixels and creates dots in these pixels. Each pixel takes only either of two states, that is, a dot-on state and a dot-off state. The image as a whole may have areas of dense dot formation and areas of sparse dot formation. Each image is thus expressed by varying the dot formation density. For example, in the case of formation of dots with black ink on white printing paper, the areas of dense dot formation express dark areas, whereas the areas of sparse dot formation express bright areas. As another example, in the case of formation of luminescent spots as dots on a liquid crystal screen, the areas of dense dot formation express bright areas, whereas the areas of sparse dot formation express dark areas. Adequate regulation of the dot formation density enables output of a multi-tone image.

Control data of the dot formation density is obtained by a preset series of image processing of object image data, which represents an object image to be output. The image-processed data is supplied to the image output device, which then creates dots in pixels specified by the supplied data. Dots are accordingly created at adequate densities on an output medium to express a resulting image.

The higher picture quality and the larger size of output images have been demanded for such image output devices. One effective measure to the better-quality demand divides an image into smaller pixels. Size reduction of pixels makes dots created in these small pixels inconspicuous and thereby enhances the picture quality of a resulting image (see, for example, Japanese Patent Laid-Open Gazette No. 2000-115716). The size expansion demand is fulfilled, on the other hand, by increasing the total number of pixels. Size expansion of individual pixels naturally expands the size of an output image, but undesirably lowers the picture quality of the output image. The effective measure to the size expansion demand thus increases the total number of pixels.

These measures to the better-quality demand and the size expansion demand of the output image, however, hinder high-speed image output. Let alone the increased number of pixels for the size expansion of the output image, the size reduction of individual pixels for the enhanced picture quality of the output image results in increasing the total number of pixels included in one image. As mentioned above, the image output device receives control data of dot formation and outputs an image according to the received control data. The increase in number of pixels included in one image thus undesirably extends the time required for data supply and interferes with high-speed image output.

DISCLOSURE OF THE INVENTION

In view of the drawbacks of the prior art techniques, the object of the invention is to provide a technique of accelerating supply of control data for dot formation to an image output device and thereby attaining high-speed image output.

In order to attain at least part of the above and the other related objects, the present invention is directed to an image output system having an image processing device that makes image data subjected to a preset series of image processing and an image output device that creates dots according to a result of the preset series of image processing to output an image.

The image processing device includes: a pixel group setting module that collects a predetermined number of plural pixels, among a large number of pixels constituting the image, to each pixel group; a dot number specification module that causes image data of respective pixels in each pixel group to be represented uniformly by preset representative image data and specifies number of dots to be created in each pixel group according to the representative image data; and a number data output module that outputs dot number data representing the specified number of dots with regard to each pixel group to the image output device.

The image output device includes: a number data receiving module that receives the output dot number data with regard to each pixel group; a priority order specification module that specifies a priority order of pixels for dot formation in each pixel group; a pixel position determination module that determines position of each dot-on pixel included in each pixel group, based on the received dot number data and the specified priority order; and a dot formation module that actually creates a dot at the determined position of each dot-on pixel.

There is an image output method corresponding to the image output system described above. The present invention is thus directed to an image output method that makes image data subjected to a preset series of image processing and creates dots according to a result of the preset series of image processing to output an image.

The image output method includes: a first step of collecting a predetermined number of plural pixels, among a large number of pixels constituting the image, to each pixel group; a second step of causing image data of respective pixels in each pixel group to be represented uniformly by preset representative image data and specifying number of dots to be created in each pixel group according to the representative image data; a third step of specifying a priority order of pixels for dot formation in each pixel group; a fourth step of determining position of each dot-on pixel included in each pixel group, based on the specified number of dots and the specified priority order; and a fifth step of actually creating a dot at the determined position of each dot-on pixel.

The image output system and the corresponding image output method of the invention collect a predetermined number of plural pixels to each pixel group. Each pixel group may be generated by gathering a plurality of existing pixels, by gathering a plurality of smaller pixel divisions of one identical pixel, which is divided for resolution enhancement of the image, or by gathering plural pixels generated for size expansion of the image. The image output system and the image output method specify the number of dots to be created in each pixel group, specify the priority order of pixels for dot formation in the pixel group, determine the position of each dot-on pixel in the pixel group, based on the specified priority order and the specified number of dots with regard to the pixel group, and actually create a dot at the determined position of each dot-on pixel.

The image data of the respective pixels in each pixel group are represented uniformly by the representative image data. This arrangement ensures extremely high-speed specification of the dot number in each pixel group. The position of each dot-on pixel in each pixel group is determined, based on the specified number of dots and the specified priority order of the pixel group. This accordingly ensures high-speed determination of the dot-on pixel positions. Selection of the priority order for dot formation with regard to each pixel group desirably prevents appearance of any specific pattern and thus keeps the high picture quality of an output image.

One preferable procedure processes each original pixel of the image to generate multiple pixels having identical image data with image data of the original pixel, so as to increase a total number of pixels in the image, and collects the multiple pixels generated from an identical original pixel to one pixel group. This arrangement ensures output of a high-quality image, because of the following reason. The position of each dot-on pixel in each pixel group is determined, based on the specified number of dots and the specified priority order of pixels in the pixel group. This pixel position determination technique does not take into account the potential effects of different image data among the respective pixels gathered to one pixel group. Determination of dot formation or no-dot formation in the respective pixels of each pixel group is, however, affected by a variation in image data among the respective pixels, as well as by the priority order of the respective pixels representing the tendency of dot formation. A significant variation of the image data among the respective pixels in one pixel group may hinder adequate determination of the dot-on pixel positions. Collection of multiple pixels generated from an identical original pixel to one pixel group enables all the multiple pixels to have identical image data in the pixel group. This arrangement enables adequate determination of the dot-on pixel positions in each pixel group based on the specified number of dots and the specified priority of pixels in the pixel group, thus ensuring output of a high-quality image.

The dot number data representing the number of dots to be created in each pixel group occupies a significantly smaller data capacity, compared with the dot on-off state data representing the dot on-off state of individual pixels included in each pixel group. Conversion of the image data into the dot number data of respective pixel groups thus reduces the required volume of data transfer and attains quick data transfer. Even when an object image has a large number of pixels, this arrangement completes data transfer within a short time period and thus enables high-speed image output.

The positions of dot-on pixels in each pixel group are determined, based on the specified number of dots and one priority order selected with regard to the pixel group among stored multiple priority orders. Even when identical dot numbers are specified for a sequence of adjacent pixel groups, this technique enables dots to be created at different pixel positions in the respective pixel groups. This avoids dot formation in a regular pattern and thereby prevents deterioration of the picture quality of a resulting image.

In the image output system and the corresponding image output method of the invention, one preferable embodiment stores multiple mappings for conversion of the representative image data of each pixel group into the number of dots to be created in the pixel group. The embodiment selects one mapping for each pixel group among the stored multiple mappings, and specifies the number of dots to be created in each pixel group, based on the representative image data of the pixel group and the selected mapping.

This arrangement ensures output of a high-quality image, because of the following reason. For example, in an area of multiple consecutive pixel groups having identical image data, the image data of the respective pixel groups are converted into different dot numbers. While respective pixel groups have only integral numbers of dots, the average dot number of the area may be an integral value or non-integral value. The value representing the average dot number may be varied continually according to the occurrence frequencies of the dot numbers in the respective pixel groups. Adequate setting of the multiple mappings thus enables conversion of the image data into the adequate dot number data of the area, thus ensuring output of a high-quality image.

Another advantage of this arrangement based on the selected mapping is easy specification of the number of dots to be created in each pixel group without identifying the respective pixels included in the pixel group.

The multiple mappings applied for conversion of image data into dot number data may be multiple threshold value sequences. Each threshold value sequence consists of plural threshold values corresponding to the predetermined number of plural pixels included in each pixel group. The procedure selects one threshold value sequence among the stored multiple threshold value sequences, and sets the number of smaller threshold values in the selected threshold value sequence that are smaller than the image data of each pixel group, to the number of dots to be created in the pixel group.

Storage of the multiple threshold value sequences as the multiple mappings advantageously requires only a small memory capacity.

The plural threshold values of each threshold value sequence may be stored together with information on an order of magnitude of the respective threshold values in the threshold value sequence. The procedure refers to the order of magnitude and compares the image data of each pixel group with the plural threshold values of the selected threshold value sequence, so as to specify the number of dots to be created in the pixel group.

Storage of the information on the order of magnitude of the respective threshold values in each threshold value sequence enables quick specification of the number of smaller threshold values than the image data of each pixel group. For example, the comparison shows that a threshold value of an N-th ordinal number of magnitude in a threshold value sequence is smaller than the image data of one pixel group and that a threshold value of an (N+1)-th ordinal number of magnitude in the threshold value sequence is greater than the image data of the pixel group. In this case, the procedure can specify the number N of smaller threshold values in the threshold value sequence that are smaller than the image data without further comparison of the image data with the remaining threshold values. This means that N dots are to be created in the pixel group. When each threshold value sequence includes a number of threshold values (for example, 20 threshold values), storage of the information on the order of magnitude of the respective threshold values in each threshold value sequence enables specification of the dot number according to the following procedure. The procedure first compares the image data with a threshold value having a middle ordinal number of magnitude (for example, a threshold value having a $10^{th}$ ordinal number). When the image data is smaller than this selected threshold value, there is no need of comparison between the image data and larger threshold values than the threshold value having the $10^{th}$ ordinal number. The procedure then compares the image data with a threshold value having a middle ordinal number of magnitude among the smaller threshold values than the threshold value having the $10^{th}$ ordinal number, for example, a threshold value having a $5^{th}$ ordinal number when a threshold value having a $1^{st}$ ordinal number is the smallest threshold value. When the image data is larger than this selected threshold value, there is no need of comparison between the image data and smaller threshold values than the threshold value having the $5^{th}$ ordinal number. The image data is thus compared with threshold values having $6^{th}$ to $9^{th}$ ordinal numbers of magnitude. In this manner, the procedure performs the comparison based on the information on the order of magnitude of the respective threshold values in each threshold value sequence and thus quickly specifies the number of dots to be created in each pixel group.

The information on the order of magnitude of the respective threshold values in each threshold value sequence may be ordinal numbers of magnitude allocated to the respective threshold values. In a simpler storage format, the plural threshold values of each threshold value sequence may be arranged in the order of magnitude, for example, in an ascending order or in a descending order.

This arrangement desirably ensures easy storage of the information on the order of magnitude of the respective threshold values without consumption of any additional memory capacity.

In the structure of storage of the information on the order of magnitude of the respective threshold values in each threshold value sequence, the following procedure enables quick specification of the dot number in each pixel group. When the image data of one pixel group is greater than a preset first threshold value, comparison with the image data of the pixel group may be performed in a descending order of the plural threshold values in the selected threshold value sequence. When the image data of one pixel group is smaller than a preset second threshold value, comparison with the image data of the pixel group may be performed in an ascending order of the plural threshold values of the selected threshold value sequence.

The procedure starts comparison from the largest threshold value for the large image data, while starting comparison from the smallest threshold value for the small image data. This arrangement ensures quick specification of the number of dots to be created in each pixel group.

In the structure of storage of the information on the order of magnitude of the respective threshold values in each threshold value sequence, comparison between the image data of each pixel group and the plural threshold values of the selected threshold value sequence may start from a threshold value having a selected ordinal number corresponding to a most recently specified dot number.

In general images, image data varies gradually. In many cases, the number of dots to be created in one pixel group is thus not significantly different from the number of dots to be created in an adjacent pixel group. When N dots are to be created in one pixel group, the number of dots to be created in a subsequently processed pixel group is generally close to N. The start of comparison from a threshold value having an N-th ordinal number of magnitude or an adjoining ordinal number desirably enables quick specification of the dot number.

Another preferable embodiment stores a simplified dither matrix that includes the multiple threshold value sequences arranged in a preset two-dimensional array, as the multiple mappings, and selects one threshold value sequence corresponding to a position of each pixel group in the image, among the multiple threshold value sequences stored in the simplified dither matrix.

Adequate arrangement of the multiple threshold value sequences enables adequate distribution of the dot numbers to be created in the respective pixel groups and thus ensures output of a high-quality image.

Like the multiple mappings, the multiple priority orders representing the tendency of dot formation in each pixel group may also be stored in the form of a matrix. This embodiment stores a priority order matrix including the multiple priority orders of pixels for dot formation in each pixel group in a preset two-dimensional array. It is desirable that the simplified dither matrix and the priority order matrix have an identical number of rows and an identical number of columns expressed by the number of pixels.

An image size is generally larger than the size of a matrix. One matrix is thus gradually shifted in position on the image and is repeatedly applied to image processing. Different sizes of the simplified dither matrix and the priority order matrix vary the positional relation between the simplified dither matrix and the priority order matrix by each shift on the image. This may lead to unstable image processing and worsen the picture quality. The identical sizes of the simplified dither matrix and the priority order matrix, on the other hand, keep the fixed positional relation by any shift on the image, thus ensuring stable image processing and desirable picture quality.

In one preferable embodiment, the dot number specification process stores the simplified dither matrix. The simplified dither matrix is generated by dividing a dither matrix, which maps threshold values to respective pixels arranged in a two-dimensional array, into multiple groups corresponding to multiple pixel groups, and includes the multiple threshold value sequences arranged corresponding to the multiple groups. The pixel position determination process stores the multiple priority orders representing the tendency of dot formation in the form of a priority order matrix. The priority order matrix is generated by dividing the dither matrix into the multiple groups corresponding to the multiple pixel groups and includes the multiple priority orders arranged corresponding to the multiple groups. Here the priority order is specified with regard to each pixel group based on a magnitude order of respective threshold values included in a corresponding group. The pixel position determination process selects one priority order corresponding to a position of each pixel group in the image, among the multiple priority orders stored in the priority order matrix, and determines the position of each dot-on pixel according to the selected priority order.

Application of the identical dither matrix by both the dot number specification module and the pixel position determination module enables adequate determination of the position of each dot-on pixel, thus ensuring output of a high-quality image.

In the image output system and the corresponding image output method of the invention, both the dot number specification module and the pixel position determination module may store the identical dither matrix and execute the respective processes according to the dither matrix.

Another application to attain the object of the invention is an image processing device that causes input image data representing an image to go through a preset series of image processing and thereby generates control data, which is used for control of dot formation by an image output device that creates dots and outputs a resulting processed image.

The image processing device includes: a pixel group setting module that collects a predetermined number of plural pixels, among a large number of pixels constituting the image, to each pixel group; a dot number specification module that causes image data of respective pixels in each pixel group to be represented uniformly by preset representative image data and specifies number of dots to be created in each pixel group according to the representative image data; and a number data output module that outputs dot number data representing the specified number of dots with regard to each pixel group as the control data to the image output device.

There is an image processing method corresponding to the image processing device described above. The present invention is thus directed to an image processing method that causes input image data representing an image to go through a preset series of image processing and thereby generates control data, which is used for control of dot formation by an image output device that creates dots and outputs a resulting processed image.

The image processing method includes the steps of (A) collecting a predetermined number of plural pixels, among a large number of pixels constituting the image, to each pixel group; (B) causing image data of respective pixels in each pixel group to be represented uniformly by preset representative image data and specifying number of dots to be created in each pixel group according to the representative image data; and (C) outputting dot number data representing the specified number of dots with regard to each pixel group as the control data to the image output device.

The image processing device and the corresponding image processing method of the invention collect a predetermined number of plural pixels to each pixel group, specify the number of dots to be created in each pixel group, and output dot number data representing the specified number of dots as the control data.

The dot number data representing the number of dots to be created in each pixel group occupies a significantly smaller data capacity, compared with the dot on-off state data representing the dot on-off state of individual pixels included in each pixel group. Even when an object image has a large number of pixels, this technique ensures quick data transfer to the image output device and resulting high-speed image output.

Collection of multiple pixels generated from an identical original pixel to one pixel group enables all the multiple pixels to have identical image data in the pixel group. This arrangement enables adequate determination of the dot-on pixel positions in each pixel group, thus ensuring output of a high-quality image, as discussed above.

In the same manner as the image output system and the corresponding image output method discussed above, the image processing device and the corresponding image processing method of the invention may store multiple mappings for conversion of image data into the dot number and select one mapping with regard to each pixel group among the stored multiple mappings to convert the image data of the pixel group into the number of dots to be created in the pixel group.

Adequate setting of the multiple mappings enables adequate conversion of the image data into the dot number data, thus ensuring output of a high-quality image.

The technique of the invention may be actualized by programs that are executed by the computer to attain the image output method and the image processing method described above, as well as by recording media in which such programs are recorded.

One application of the invention is a program corresponding to the image output method discussed above. The present invention is thus directed to an image output program that is executed by a computer to make image data subjected to a preset series of image processing, create dots according to a result of the preset series of image processing, and thereby output an image.

The image output program causes the computer to attain: a first function of collecting a predetermined number of plural pixels, among a large number of pixels constituting the image, to each pixel group; a second function of causing image data of respective pixels in each pixel group to be represented uniformly by preset representative image data and specifying number of dots to be created in each pixel group according to the representative image data; a third function of specifying a priority order of pixels for dot formation in each pixel group; a fourth function of determining position of each dot-on pixel included in each pixel group, based on the specified number of dots and the specified priority order; and a fifth function of actually creating a dot at the determined position of each dot-on pixel.

In one preferable embodiment of the image output program, the second function has the functions of storing multiple mappings for conversion of the representative image data of each pixel group into the number of dots to be created in the pixel group; and selecting one mapping for each pixel group among the stored multiple mappings. The second function specifies the number of dots to be created in each pixel group, based on the representative image data of the pixel group and the selected mapping.

Another application of the invention is a program corresponding to the image processing method discussed above. The present invention is thus directed to an image processing program that is executed by a computer to make image data of an image subjected to a preset series of image processing and thereby generate control data, which is used for control of dot formation by an image output device that creates dots and outputs a resulting processed image.

The image processing program causes the computer to attain the functions of: (A) collecting a predetermined number of plural pixels, among a large number of pixels constituting the image, to each pixel group; (B) causing image data of respective pixels in each pixel group to be represented uniformly by preset representative image data and specifying number of dots to be created in each pixel group according to the representative image data; and (C) outputting dot number data representing the specified number of dots with regard to each pixel group as the control data to the image output device.

The technique of the invention may also be actualized by recording media in which such programs are recorded in a computer readable manner.

The computer reads any of such programs, which may be recorded in the recording media, to attain the various functions described above. This ensures high-speed image output even when an object image has a large number of pixels.

BRIEF DESCRIPTION OF THE DRAWINGS

FIGS. 6($a$) and 6($b$) show resolution conversion of image data;

FIG. 8 shows part of a dither matrix;

FIGS. 13(a) through 13(c) show a process of generating dot number data in a number data generation process of a first modified example of the first embodiment;

FIGS. 16(a) and 16(b) show replacement of tone values of individual pixels included in one pixel group with a mean tone value according to the presence or the absence of an edge in the pixel group;

FIGS. 17(a) through 17(c) show data formats output from the computer in the second embodiment;

FIG. 18 shows another data format output from the computer in the second embodiment;

FIGS. 22(a) and 22(b) show a process of generating dot number data from dot data in a number data generation process of the third embodiment;

FIG. 25 conceptually shows a conversion table referred to for encoding dot number data of the respective size dots;

FIG. 29 conceptually shows a decoding table referred to in the pixel position determination process of the third embodiment;

BEST MODES OF CARRYING OUT THE INVENTION

Some modes of carrying out the invention are discussed below as preferred embodiments in the following sequence to describe the objects, features, aspects, and advantages of the present invention more apparently: Some modes of carrying out the invention are discussed below as preferred embodiments in the following sequence to describe the objects, features, aspects, and advantages of the present invention more apparently.

A. General Outline of System
B. First Embodiment
B-1. System Configuration
B-2. Schema of Image Printing Process
B-3. Number Data Generation Process in First Embodiment
B-4. Pixel Position Determination Process in First Embodiment
B-5. Modified Examples
C. Second Embodiment
C-1. Number Data Generation Process in Second Embodiment
C-2. Pixel Position Determination Process in Second Embodiment
D. Third Embodiment
D-1. Schema of Image Printing Process in Third Embodiment
D-2. Number Data Generation Process in Third Embodiment
D-3. Pixel Position Determination Process in Third Embodiment
E. Modifications

A. General Outline of System

Figure 1:
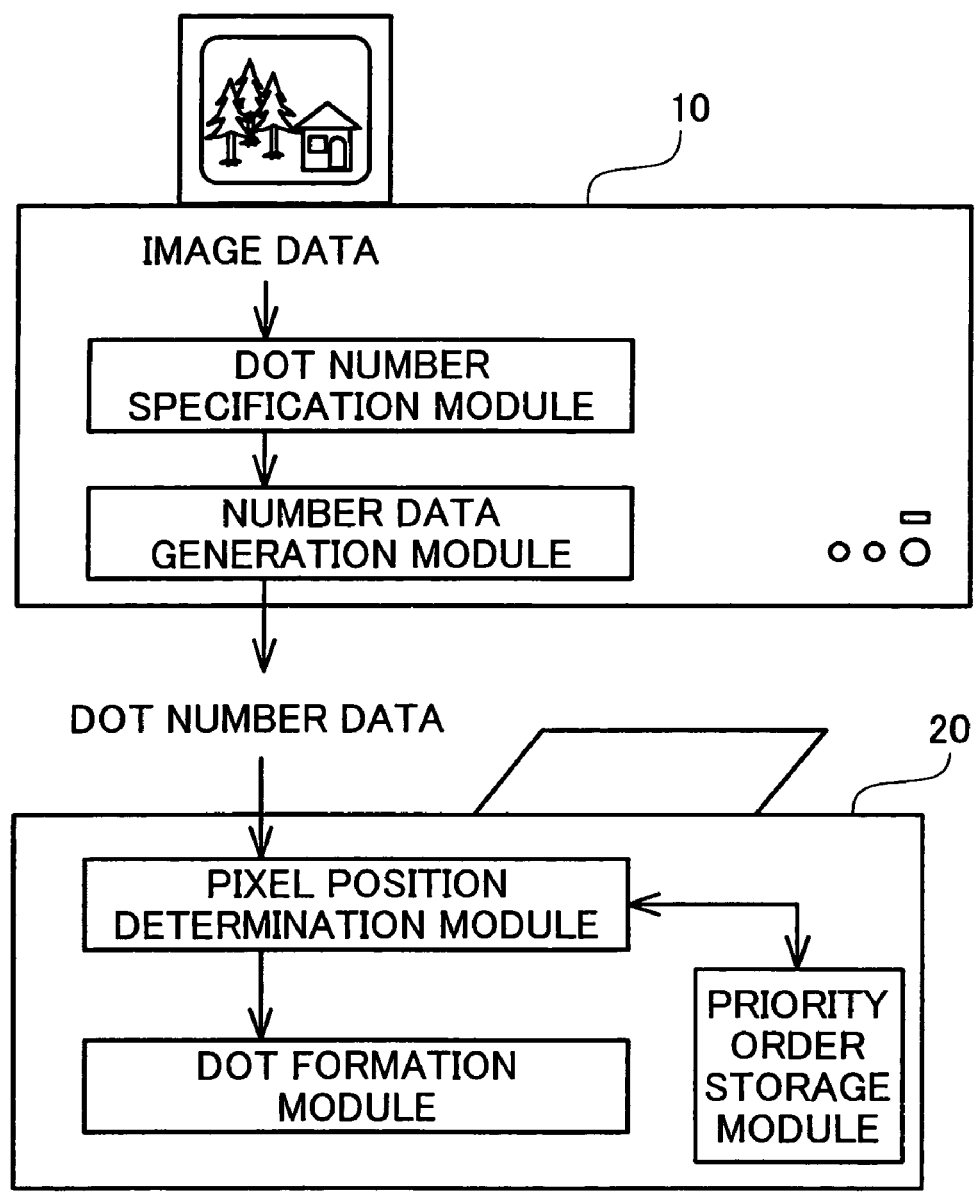
FIG. 1 schematically illustrates a printing system to explain the general outline of the invention.

The general outline of a system embodying the invention is described with reference to FIG. 1, prior to detailed description of respective embodiments. FIG. 1 schematically illustrates the configuration of a printing system as one mode of an image output control system of the invention. The printing system includes a computer 10 as an image processing device and a printer 20 as an image output device. The computer 10 loads and executes preset programs and works in combination with the printer 20 as the integral printing system. The printer 20 creates dots on a printing medium to print an image. The computer 10 makes image data, which represent an object image to be printed, subjected to a preset series of image processing to generate and supply control data to the printer 20, which then controls dot formation in respective pixels according to the received control data.

In a general printing system, the computer converts image data into dot on-off state data representing the dot on-off state in respective pixels constituting an object image and supplies the dot on-off state data to the printer. The printer creates dots according to the received dot on-off state data to complete a printed image. An increasing number of pixels included in an object image to be printed naturally leads to an increasing volume of the dot on-off state data of the respective pixels. The increased data volume undesirably extends the time required for data transfer from the computer to the printer and thereby the total printing time. In the printing system 10 of FIG. 1, the computer 10 accordingly has a dot number specification module and a number data generation module to execute the following series of processing.

The dot number specification module collects a predetermined number of plural pixels, among a large number of pixels constituting the image, to each pixel group and specifies the number of dots to be created in each pixel group according to image data. The dot number data in each pixel group is generated by dividing image data into pixel groups and determining the dot on-off state in each of the pixel groups. Another applicable procedure may convert image data into data representing the dot on-off state, collect every predetermined number of multiple pixels to one pixel group, and determine the number of dots to be created in each pixel group. The predetermined number of multiple pixels collected to one pixel group may not be mutually adjacent pixels. The number data generation module sends the dot number data generated with respect to each of the pixel groups to the printer 20.

The printer 20 shown in FIG. 1 has a priority order storage module, a pixel position determination module, and a dot formation module. The priority order storage module stores multiple options for the priority order of pixels in each pixel group to create dots therein. The pixel position determination module refers to the priority order storage module and determines the positions of dot-on pixels, where dots are to be created, in each pixel group. A concrete procedure of the pixel position determination receives dot number data with respect to one pixel group and chooses one from the multiple options for the priority order of pixels stored in the priority order storage module. The procedure then selects a certain number of pixels specified by the dot number data as dot-on pixels according to the chosen priority order, among the predetermined number of multiple pixels included in the pixel group. In this manner, the pixel position determination module receives the dot number data, chooses the priority order of pixels in each pixel group, and determines the positions of dot-on pixels. The dot formation module actually creates dots in the dot-on pixels thus determined. A resulting image is accordingly recorded on a printing medium.

In the printing system of FIG. 1, the computer 10 supplies the dot number data representing the number of dots to be created in each pixel group, instead of the dot on-off state data of individual pixels, to the printer 20. This arrangement desirably reduces the total volume of data supply, compared with the structure of supplying the dot on-off state data of individual pixels. Even when an image includes a large number of pixels, this arrangement ensures quick data supply from the computer 10 to the printer 20 and thereby enables high-speed printing of a resulting image. Several embodiments of this printing system are discussed below.

B. First Embodiment

B-1. System Configuration

Figure 2:
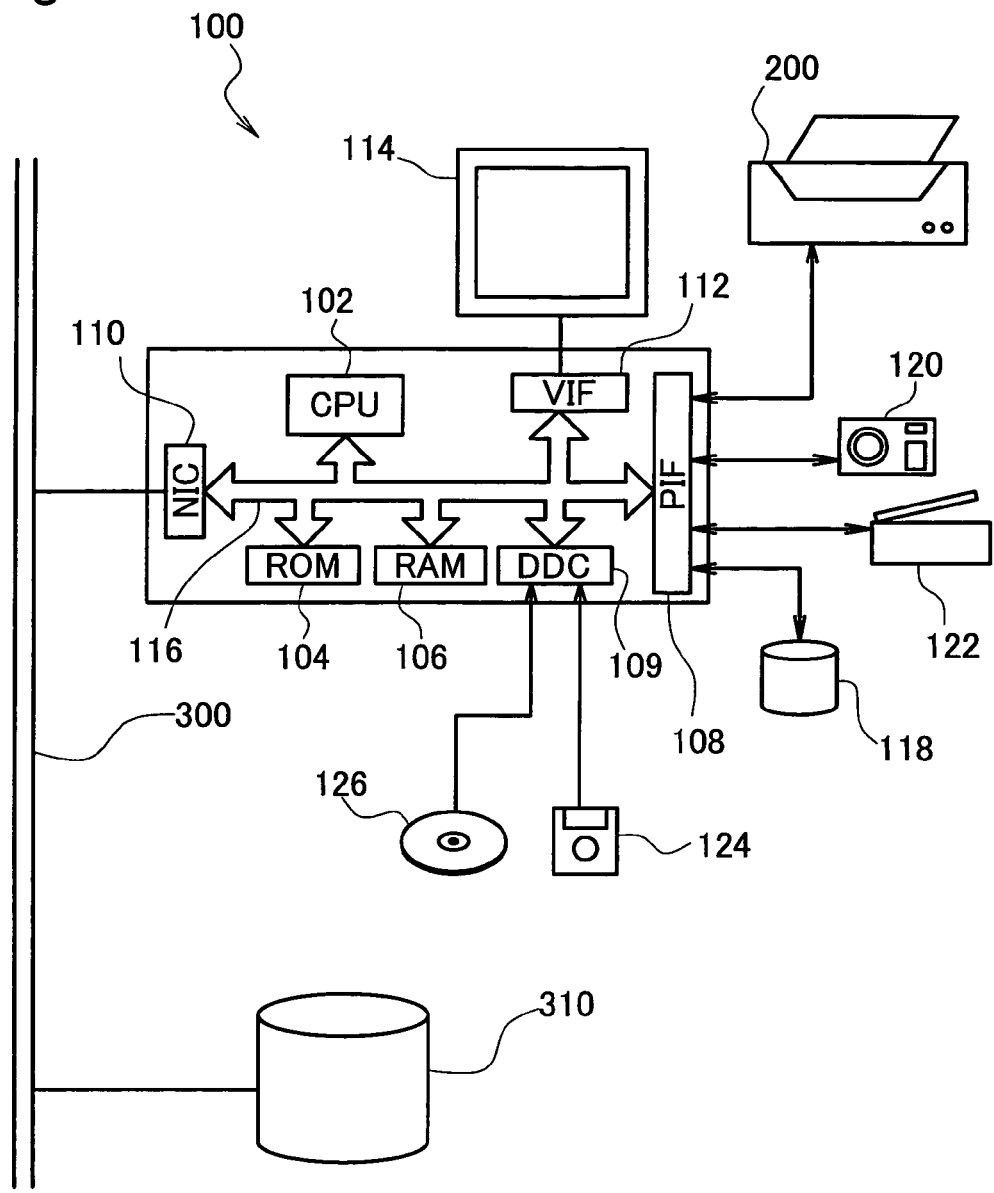
FIG. 2 illustrates the configuration of a computer as an image processing device of an embodiment.

FIG. 2 illustrates the configuration of a computer 100 as an image processing device in a first embodiment. The computer 100 is a known computer including a CPU 102, a ROM 104, and a RAM 106 interconnected via a bus 116.

The computer 100 has a disk controller DDC 109 to read data from, for example, a flexible disk 124 or a compact disc 126, a peripheral equipment interface PIF 108 to receive and send data from and to peripheral equipment, and a video interface VIF 112 to drive and actuate a CRT 114. The PIF 108 is connected with a color printer 200 described later and a hard disk unit 118. Connection of a digital camera 120 or a color scanner 122 with the PIF 108 enables printing of images taken by the digital camera 120 or the color scanner 122. Insertion of a network interface card NIC 110 to the computer 100 causes the computer 100 to connect with a communication line 300 and obtain data stored in a storage device 310 linked to the communication line 300.

Figure 3:
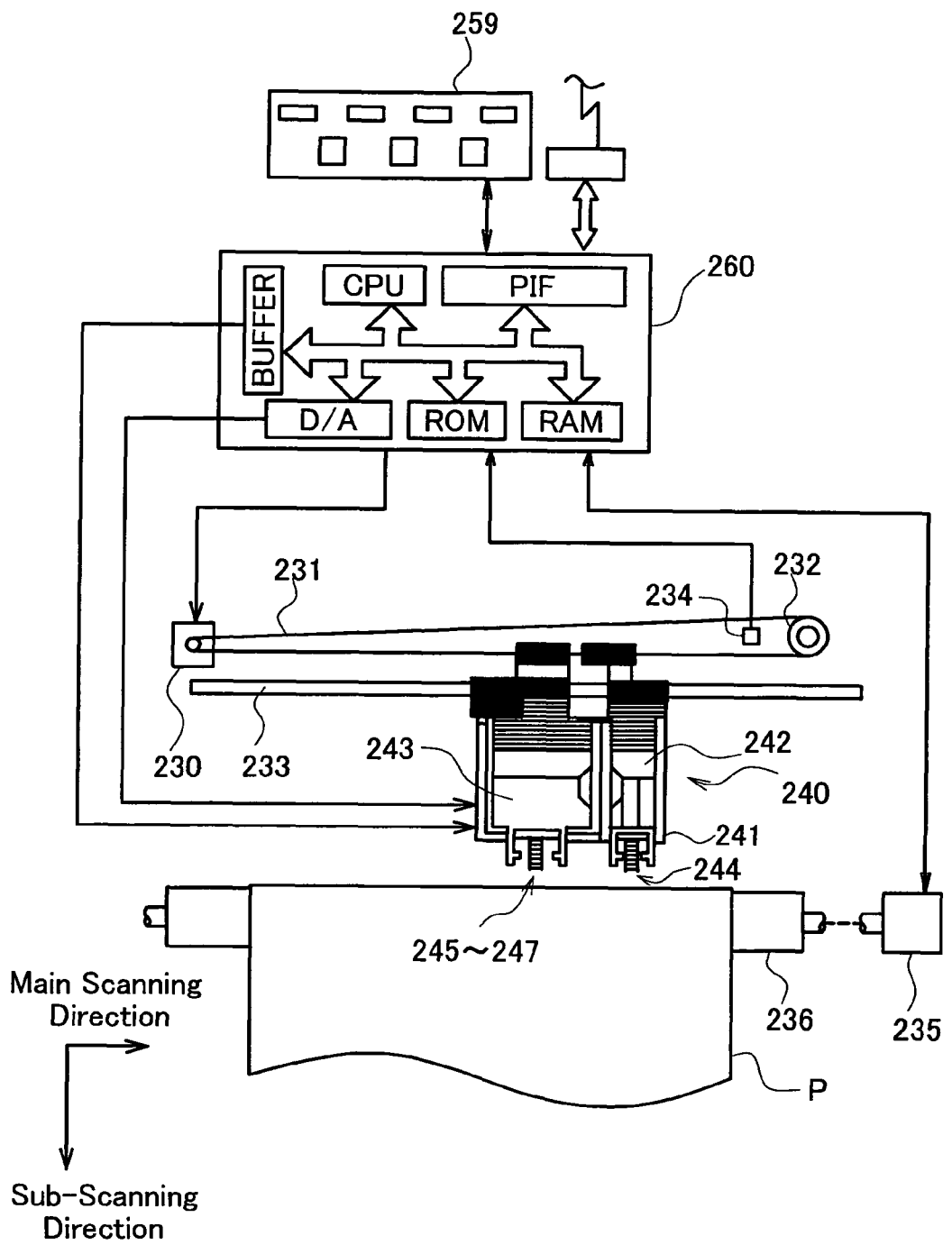
FIG. 3 schematically illustrates the structure of a printer as an image output device of the embodiment.

FIG. 3 schematically illustrates the structure of the color printer 200 in this embodiment. The color printer 200 is an inkjet printer that is capable of creating dots of four color inks, cyan, magenta, yellow, and black. The inkjet printer may be capable of creating dots of six color inks, cyan ink of a lower dye density (light cyan ink) and magenta ink of a lower dye density (light magenta ink), in addition to the above four color inks. In the description below, cyan ink, magenta ink, yellow ink, black ink, light cyan ink, and light magenta ink may be expressed simply as C ink, M ink, Y ink, K ink, LC ink, and LM ink, respectively.

As illustrated, the color printer 200 has a mechanism of actuating a print head 241 mounted on a carriage 240 to eject inks and create dots, a mechanism of activating a carriage motor 230 to move the carriage 240 back and forth along a shaft of a platen 236, a mechanism of activating a paper feed motor 235 to feed printing paper P, and a control circuit 260 that controls the formation of dots, the shift of the carriage 240, and the feed of the printing paper P.

An ink cartridge 242 for storing the K ink and an ink cartridge 243 for storing the C, M, and Y inks are attached to the carriage 240. The respective inks in the ink cartridges 242 and 243 attached to the carriage 240 are supplied through non-illustrated ink conduits to corresponding ink ejection heads 244 through 247 of the respective colors formed on the bottom face of the print head 241.

Figure 4:
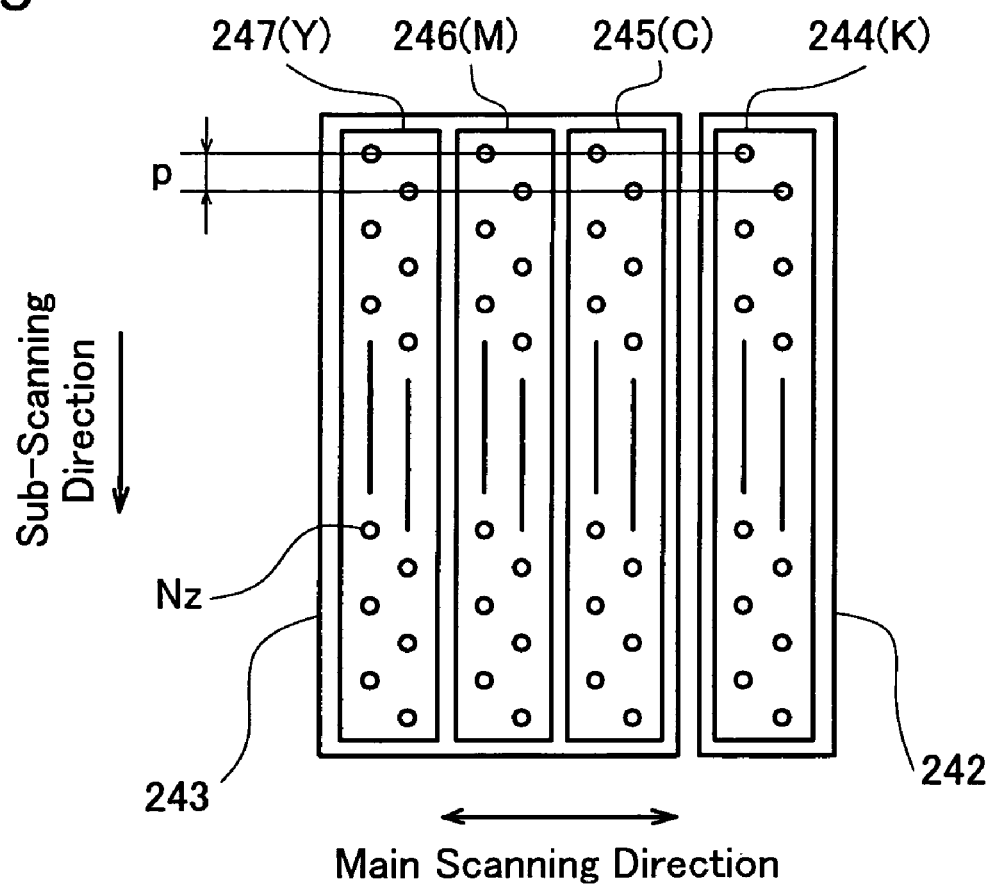
FIG. 4 shows an arrangement of nozzles Nz on respective ink ejection heads.

FIG. 4 shows an arrangement of inkjet nozzles Nz on the respective ink ejection heads 244 through 247. Four nozzle arrays for ejecting the C, M, Y, and K color inks are formed on the bottom face of the respective ink ejection heads 244 through 247. Each nozzle array includes 48 nozzles Nz arranged at a fixed nozzle pitch 'k'.

The control circuit 260 includes a CPU, a ROM, and a RAM interconnected via a bus. The control circuit 260 controls the operations of the carriage motor 230 and the paper feed motor 235 to regulate main scans and sub-scans of the carriage 240, while controlling ejection of ink droplets from the respective nozzles at adequate timings according to print data supplied from the computer 100. The color printer 200 creates ink dots of the respective colors at adequate positions on a printing medium under control of the control circuit 260 and thereby prints a resulting color image.

Any of diverse methods may be applied to eject ink droplets from the ink ejection heads of the respective colors. Typical examples of the available technique include a method that uses piezoelectric elements for ejection of ink droplets and a method that uses heaters located in respective ink conduits to generate bubbles in the ink conduits for ejection of ink droplets. The technique of the invention is also applicable to printers that take advantage of thermal transfer to create ink dots on a printing medium and printers that take advantage of static electricity to make toners of respective colors adhere to a printing medium, in addition to the inkjet printers.

In the color printer 200 having the hardware configuration discussed above, the carriage motor 230 is driven to move the ink ejection heads 244 through 247 of the respective colors in a main scanning direction relative to the printing paper P, while the paper feed motor 235 is actuated to feed the printing paper P in a sub-scanning direction. The control circuit 260 repeats main scans and sub-scans of the carriage 240 and drives nozzles at adequate timings to eject ink droplets according to print data. The color printer 200 thus prints a resulting color image on the printing paper P.

B-2. Schema of Image Printing Process

Figure 5:
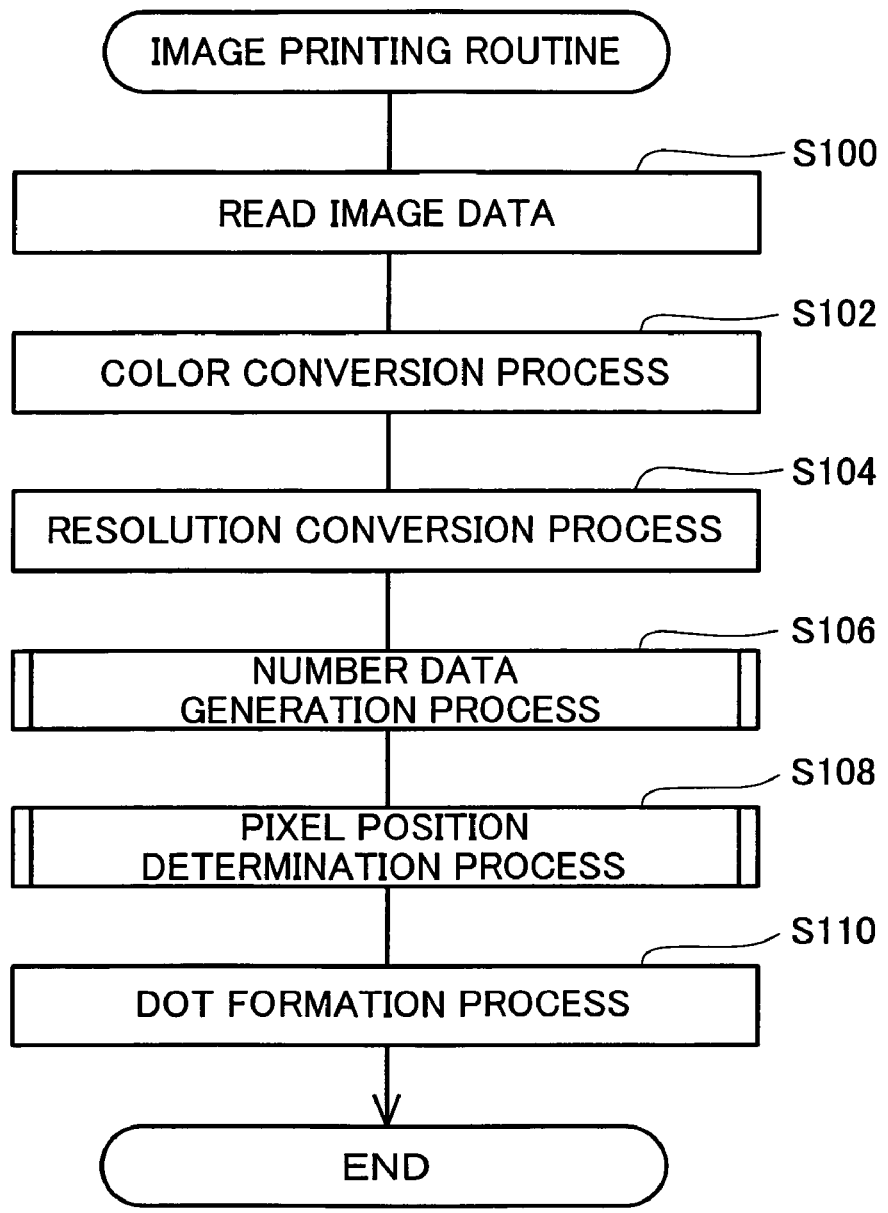
FIG. 5 is a flowchart showing an image printing routine executed by the image processing device of a first embodiment.

FIG. 5 is a flowchart showing an image printing routine executed by the computer 100 and the printer 200 in the system of the embodiment, so as to make object image data subjected to a preset series of image processing and print a processed image on a printing medium. The first half of the image printing routine is performed by the CPU of the computer 100, whereas the latter half is performed by the CPU of the control circuit 260 in the printer 200. The image printing process of the embodiment is described below with reference to the flowchart of FIG. 5.

When the image printing routine starts, the computer 100 first reads object image data to be converted (step S100). The object image data are RGB color image data in this embodiment, although monochromatic image data may be replaced with the color image data.

The input color image data goes through a color conversion process (step S102). The color conversion process converts the RGB color image data expressed by combinations of tone values of the colors R, G, and B into image data expressed by combinations of tone values of respective colors used for printing. As mentioned above, the printer 20 prints an image with the four color inks C, M, Y, and K. The color conversion process of this embodiment accordingly converts the image data expressed by the tone values of the colors R, G, and B into image data expressed by the tone values of the four colors C, M, Y, and K. The procedure of color conversion refers to a three-dimensional numerical table called a color conversion table (LUT). The LUT stores a mapping of the tone values of the respective colors C, M, Y, and K to the RGB color image data and thus facilitates and accelerates the color conversion.

The color-converted image data then goes through a resolution conversion process (step S104). The resolution conversion process converts the resolution of the image data into a resolution for printing with the printer 200 (printing resolution). As described previously, size reduction of pixels to attain printing at the higher resolution effectively enhances the picture quality of resulting prints. The increased resolution of original image data is, however, not essential for the increased printing resolution. The dot printing technique takes only either of a dot-on state or a dot-off state with respect to each pixel. Even in the case of variable-size dot printing, only several tones are expressible in each pixel. The input image data of, for example, 1 byte, on the other hand, can express 256 tones with respect to each pixel. Namely the number of expressible tones by dot printing in each pixel is significantly different from the number of expressible tones by the input image data. Setting the higher printing resolution than the resolution of the input image data thus leads to improvement in picture quality of resulting prints. On this ground, the process of step S104 in the flowchart of FIG. 5 converts the resolution of the input image data into the higher printing resolution.

FIGS. 6(*a*) and 6(*b*) show an example of the resolution conversion process executed in the first embodiment. The prior color conversion gives the image data of the C, M, Y, and K colors. The resolution conversion process discussed below is applied to the image data in any of these colors. For the simplicity of explanation, the color is not specified in the following description.

FIG. 6(*a*) shows part of image data after color conversion. The color-converted image data has tone values allocated to the respective pixels arranged in lattice. Each rectangle in FIG. 6(*a*) represents a pixel, and the numeral in the rectangle denotes a tone value allocated to the pixel. One available method to increase the resolution of the image data creates new pixels by interpolation of existing pixels. The resolution conversion process of this embodiment, however, adopts the simplest technique of dividing each pixel into smaller pixels.

FIG. 6(*b*) shows division of pixels for conversion of the resolution. In the illustrated example, each pixel is divided into four in the main scanning direction (the horizontal direction in the drawing) and into two in the sub-scanning direction (the vertical direction in the drawing). Namely one pixel is divided into eight smaller pixels. The broken lines in each solid rectangle of FIG. 6(*b*) represent divisions of each pixel. The tone value given to the original pixel is allocated to all the smaller divisions of the pixel. Such division of pixels quadruples the resolution of the image data in the main scanning direction and doubles in the sub-scanning direction. The multiplication of resolution may be set arbitrarily according to the requirements.

After conversion of the input resolution into the printing resolution, the computer 100 starts a number data generation process (step S106). The color-converted image data are tone data having tone values allocated to the respective pixels. The printer 200 creates dots at adequate densities on pixel positions to print an image. The required procedure accordingly converts the tone data into dot on-off state data of the respective pixels and transfers the dot on-off state data to the printer 200. Output of the dot on-off state data in units of individual pixels to the printer 200 undesirably extends the time required for data transfer with an increase in number of pixels and thereby impedes high-speed image printing. The image printing process of this embodiment collects every predetermined number of multiple pixels to one pixel group and transfers dot number data representing the number of dots to be created in each pixel group to the printer 200 in units of pixel groups. The dot number data representing the number of dots to be created in each pixel group may be obtained by converting image data into dot on-off state data of respective pixels and then collecting every predetermined number of multiple pixels to one pixel group. Another applicable procedure may first collect every predetermined number of multiple pixels to one pixel group and then determine the number of dots to be created in each pixel group as discussed later. The number data generation process of step S106 generates the dot number data representing the number of dots to be created in each pixel group and transfers the generated dot number data to the printer 20. The details of the number data generation process will be discussed later.

The CPU of the control circuit 260 in the printer 200 receives the dot number data supplied from the computer 100 and starts a pixel position determination process (step S108). As mentioned above, the computer 100 supplies the dot number data that represent the number of dots to be created in each pixel group, instead of the dot on-off state data of respective pixels. The pixel position determination process determines the positions of dot-on pixels in each pixel group, based on the received dot number data with respect to the pixel group. The details of the pixel position determination process will be discussed later.

After determination of the positions of dot-on pixels, the printer 200 actually creates dots at the dot-on pixel positions thus determined (step S110). As discussed previously with reference to FIG. 3, while repeating the main scans and the sub-scans of the carriage 240, the printer 200 drives and actuates the ink ejection heads to eject the ink droplets and thereby create ink dots on the printing paper. A resulting image corresponding to image data is thus printed on the printing paper.

B-3. Number Data Generation Process in First Embodiment

Figure 7:
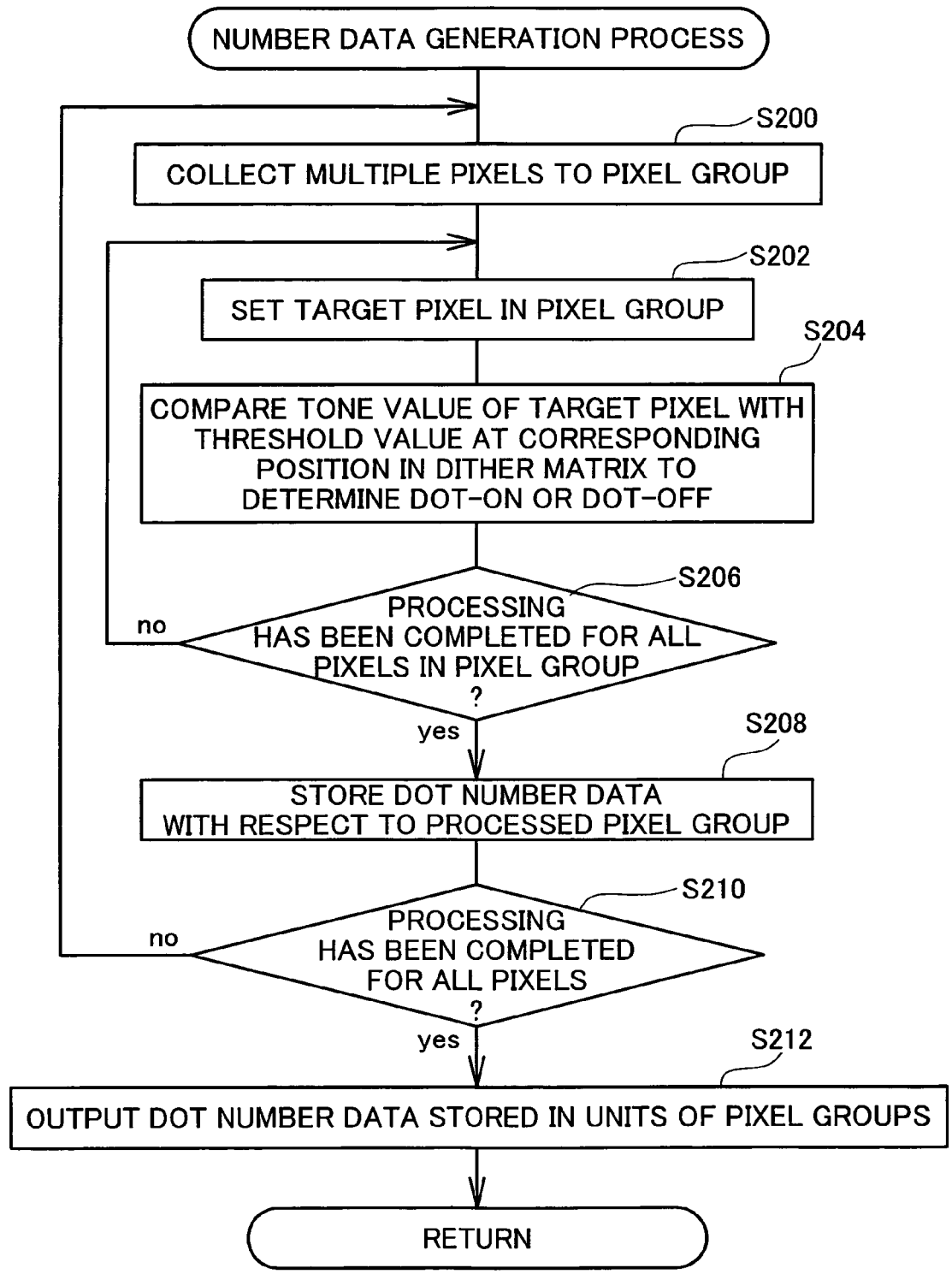
FIG. 7 is a flowchart showing the details of a number data generation process executed in the first embodiment.

FIG. 7 is a flowchart showing the details of the number data generation process executed in the first embodiment. The details of the number data generation process are described with reference to this flowchart.

The number data generation process first collects a predetermined number of multiple pixels to a pixel group (step S200). The precedent resolution conversion process has divided one pixel into eight smaller pixels. In this embodiment, the eight smaller pixels obtained by division of one pixel are thus collected to one pixel group. For example, one pixel on the upper left corner of FIG. 6(*a*) is divided into eight smaller pixels arranged vertically in four columns and horizontally in two rows on the upper left corner of FIG. 6(*b*). These eight smaller pixels constitute one pixel group. The predetermined number of multiple pixels collected to one pixel group may not be mutually adjacent pixels, but may be any pixels having a specified positional relation.

In the case of collecting multiple smaller pixels as divisions of one identical pixel to one pixel group, the resolution conversion process may be omitted from the image printing routine of FIG. 5. In the case of such omission, the terminology 'pixel group' in the following description is to be replaced by 'the pixel prior to resolution conversion'.

The number data generation process subsequently sets one object pixel for determination of the dot on-off state (target pixel) among the predetermined number of multiple pixels collected to one pixel group (step S202). The process then compares the tone value allocated to the target pixel with a threshold value stored at the corresponding position in a dither matrix to determine the dot on-off state with respect to the target pixel (step S204). The dither matrix is a two-dimensional numerical table that stores multiple threshold values arranged in lattice. The procedure of determining the dot on-off state based on a dither matrix is described with reference to FIGS. 8 and 9. FIG. 8 shows part of a dither matrix. This dither matrix stores threshold values, which are selected at random throughout a tone value range of 1 to 255 and are allocated to a total of 4096 pixels of 64 pixels in length and 64 pixels in width. In this embodiment, the image data are 1-byte data and the tone value allocated to each pixel is in the range of 0 to 255, so that the threshold values in the dither matrix are selected in the tone value range of 1 to 255. The dither matrix is not restricted to the size of 64 pixels in both length and width as in the example of FIG. 8, but may have any desired size having different numbers of pixels in length and in width or having the same numbers of pixels in both length and width.

Figure 9:
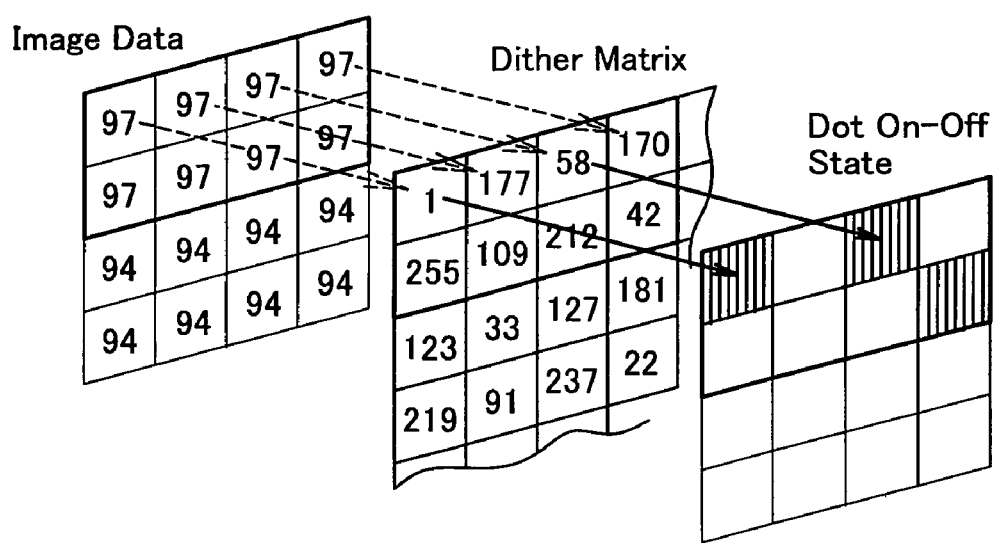
FIG. 9 shows a process of determining dot on-off state of individual pixels by referring to the dither matrix.

FIG. 9 conceptually shows determination of the dot on-off state with respect to each target pixel, based on the dither matrix. The procedure of determining the dot on-off state first compares the tone value of each target pixel with a threshold value stored at the corresponding position in the dither matrix. Each arrow of thin broken line in FIG. 9 represents comparison between the tone value of each target pixel and a threshold value stored at the corresponding position in the dither matrix. When the tone value of the target pixel is greater than the corresponding threshold value in the dither matrix, the process determines formation of a dot in the target pixel. When the tone value of the target pixel is smaller than the corresponding threshold value in the dither matrix, on the contrary, the process determines formation of no dot in the target pixel. In the example of FIG. 9, the tone value allocated to a pixel on the upper left corner of image data is '97', while the threshold value stored at the corresponding position in the dither matrix is '1'. Namely the process determines formation of a dot in this pixel. Each arrow of solid line in FIG. 9 represents a process of determining formation of a dot in a target pixel and writing the result of determination at a corresponding position in a memory. An adjacent pixel on the right side of the upper left pixel also has the tone value '97', while the corresponding threshold value in the dither matrix is '177'. The threshold value is greater than the tone value, so that the process determines formation of no dot in this pixel. In this manner, the process refers to the dither matrix and determines formation or no-formation of a dot in the target pixel at step S204 in the flowchart of FIG. 7.

The number data generation process then determines whether the above series of processing has been completed with respect to all the pixels in the pixel group (step S206). When the pixel group still has any unprocessed pixel (step S206: no), the process returns to step S202 and repeats the subsequent series of processing. When the dot on-off state has been determined with respect to all the pixels in the pixel group (step S206: yes), the process detects the number of dots to be created in the pixel group as dot number data and stores the dot number data with respect to the processed pixel group into the memory (step S208). In the illustrated example of FIG. 9, three pixels are determined as dot-on pixels in the pixel group on the upper left corner of the image data. Namely the dot number data representing the dot number '3' is stored into the memory.

After conclusion of the processing with regard to one pixel group, the process subsequently determines whether the processing has been completed with regard to all the pixels included in image data (step S210). When there is any unprocessed pixel, the process returns to step S200 to set a next pixel group, repeats the subsequent series of processing to generate dot number data with regard to the next pixel group, and stores the dot number data (step S208). When the processing has been completed with regard to all the pixels in the image data (step S210: yes), the process outputs the dot number data stored in units of pixel groups to the printer 200 (step S212). Here terminates the number data generation process shown in FIG. 7.

Figure 10A:
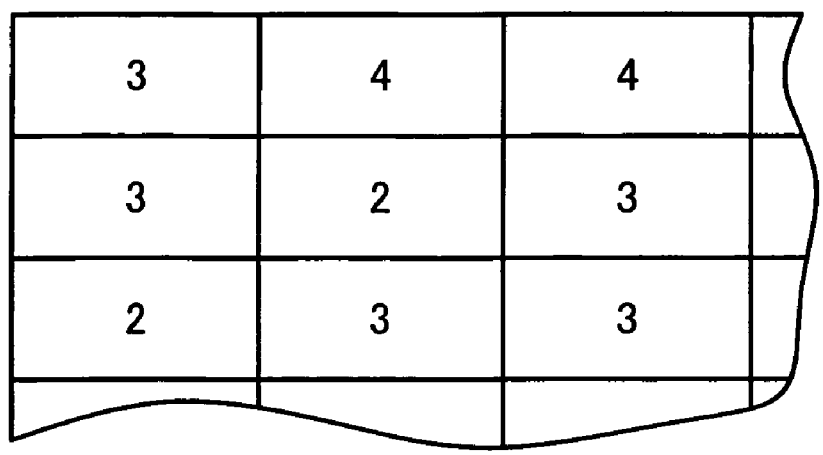
FIGS. 10($a$) and 10($b$) conceptually show a process of generating dot number data with regard to each pixel group.
Figure 10B:
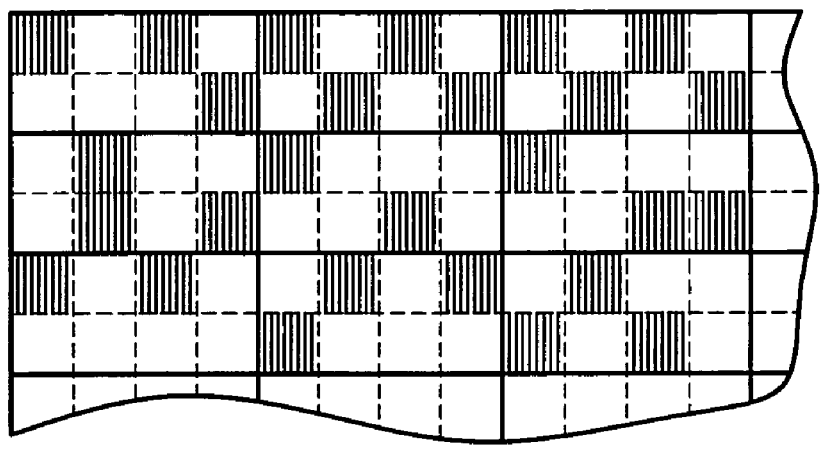

FIG. 10(*a*) conceptually shows dot number data obtained by the number data generation process discussed above. Each of multiple rectangles represents a pixel group, and the numeral shown in each pixel group denotes storage of the number of dots to be created in the pixel group. In the system of this embodiment, the computer 100 converts color-converted image data into dot number data as shown in FIG. 10(*a*) and outputs only the dot number data stored with respect to each pixel group to the printer 200. Output of only the dot number data desirably reduces the data volume and thus ensures higher-speed data output, compared with the procedure of outputting the dot on-off state data of individual pixels, as discussed below.

FIG. 10(*b*) shows the dot on-off state of respective pixels in multiple pixel groups. The thin broken lines in FIG. 10(*b*) show that each pixel group consists of multiple pixels. Each square filled with slant lines represents a dot-on pixel where a dot is to be created.

It is assumed that the computer 100 outputs the dot on-off state data of individual pixels as shown in FIG. 10(*b*) to the printer 200. When there is only one type of dot, each pixel takes only either of the two states, that is, the dot-on state or the dot-off state. The data volume required for each pixel is accordingly 1 bit. Since each pixel group consists of eight pixels, the data volume output to the printer 200 is 8 bits with respect to each pixel group.

The procedure of this embodiment, on the other hand, outputs the dot number data representing the number of dots to be created in each pixel group. The number of dots to be created in one pixel group varies in the range of 0 to 8. The dot number data with respect to each pixel group thus requires only 4 bits. This desirably halves the data volume, compared with output of the dot on-off state data of individual pixels. Output of the dot number data in units of pixel groups thus attains high-speed data transfer to the printer 200. The dot number data transferred from the computer 100 go through the pixel position determination process executed by the printer 200 to be converted into the dot on-off state data of individual pixels, as discussed below.

B-4. Pixel Position Determination Process in First Embodiment

Figure 11:
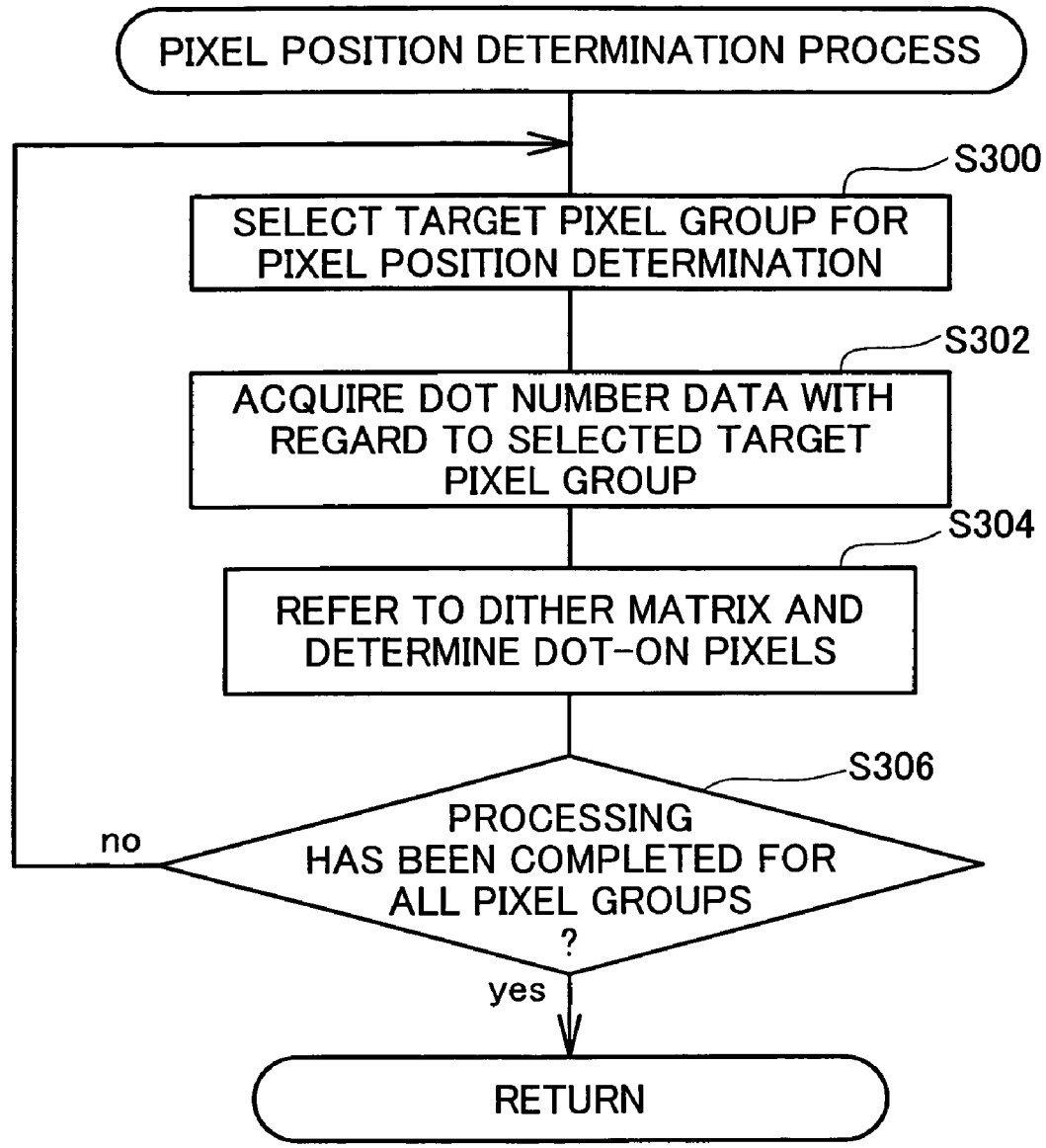
FIG. 11 is a flowchart showing the details of a pixel position determination process executed in the first embodiment.
Figures 12A, 12B, 12C, 12D:
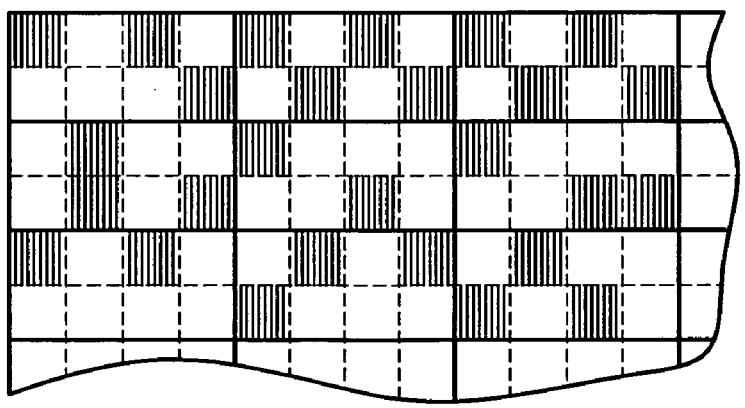
FIGS. 12(a) through 12(d) show a process of determining the positions of dot-on pixels according to the dot number data in the pixel position determination process of the first embodiment.

FIG. 11 is a flowchart showing the details of the pixel position determination process executed in the image printing routine of the first embodiment. The CPU of the control circuit 260 in the printer 200 receives the dot number data transferred in units of pixel groups from the computer 100 and executes the pixel position determination process. FIG. 12 conceptually shows conversion of the dot number data representing the number of dots to be created in each pixel group into the dot on-off state data of individual pixels by the pixel position determination process. The details of the pixel position determination process are described below with reference to FIGS. 11 and 12.

The pixel position determination process first selects a target pixel group as an object of processing (step S300 in the flowchart of FIG. 11) and acquires the dot number data representing the number of dots to be created in the selected target pixel group (step S302). FIG. 12(*a*) conceptually shows the dot number data transferred in units of pixel groups from the computer 100. In this illustrated example, a pixel group on the upper left corner is selected as a target pixel group going through the pixel position determination process. The process acquires the dot number data '3' as the number of dots to be created in the selected target pixel group at step S302 in FIG. 11.

The process subsequently refers to a priority order of pixels in the target pixel group for dot formation and determines dot-on pixels (step S304). In this example, the dither matrix is used to set the priority order of dot formation. As discussed previously with reference to FIG. 8, threshold values are set at respective pixel positions in the dither matrix. Determination of the dot on-off state in one pixel compares the tone value of image data allocated to the pixel with a threshold value at the corresponding position in the dither matrix. When the tone value is greater than the threshold value, the pixel is determined as a dot-on pixel. The pixel having the smaller setting of the threshold value in the dither matrix has the greater tendency of dot formation. The dither matrix is thus assumed to show the priority order of respective pixels for dot formation. The procedure of this embodiment takes advantage of the characteristics of the dither matrix and uses the dither matrix to set the priority order of pixels in the target pixel group for dot formation.

In the illustrated example of FIG. 12(*a*), the pixel group on the upper left corner is selected as the target pixel group to be processed. The procedure reads threshold values in the dither matrix stored at corresponding positions of the respective pixels included in the selected target pixel group. FIG. 12(*b*) shows threshold values read from the corresponding pixel positions in the dither matrix shown in FIG. 8. Dots are created in the order of pixels having the smaller threshold values. The number of dots to be created in the currently processed target pixel group is 3 as shown in FIG. 12(*a*). The positions of dot-on pixels are determined according to the priority order of pixels for dot formation as shown in FIG. 12(*c*). In this illustrated example of FIG. 12(*c*), the pixel of the smallest threshold value surrounded by the solid line, the pixel of the second smallest threshold value surrounded by the broken line, and the pixel of the third smallest threshold value surrounded by the one-dot chain line are determined as dot-on pixels.

After determination of the positions of dot-on pixels in the target pixel group selected as the object of processing, it is determined whether the processing has been completed with regard to all the pixel groups (step S306 in the flowchart of FIG. 11). When there is any unprocessed pixel group (step S306: no), the pixel position determination process returns to step S300 to set a next pixel group and repeats the subsequent series of processing with respect to the next pixel group. The dot number data representing the number of dots to be created in each pixel group as shown in FIG. 12(*a*) are accordingly converted to the dot on-off state data of individual pixels as shown in FIG. 12(*d*). The squares filled with slant lines in FIG. 12(*d*) represent the dot-on pixels. On conclusion of the processing with regard to all the pixel groups (step S306: yes), the program exits from the pixel position determination process shown in FIG. 11 and returns to the image printing routine of FIG. 5.

The above description regards the image printing process executed in the first embodiment, as well as the details of the number data generation process and the pixel position determination process included in the image printing process. In the image printing process of the first embodiment, the computer 100 transfers the dot number data representing the number of dots to be created in each pixel group to the printer 200, instead of the dot on-off state data of the individual pixels. This arrangement significantly reduces the total volume of data transfer. Even when an image includes a large number of pixels, the procedure of the first embodiment ensures quick data transfer and high-speed image printing.

As described above, the dither matrix referred to in the number data generation process executed by the computer 100 is identical with the dither matrix referred to in the pixel position determination process executed by the printer 200. Such setting ensures complete restoration of the positions of dot-on pixels even in the case of transfer of only the dot number data from the computer 100 to the printer 200. As clearly understood from the comparison between FIG. 10(*b*) and FIG. 12(*d*), the positions of dot-on pixels based on the determination of the dot on-off state of the individual pixels executed by the computer 100 are perfectly matched with the positions of dot-on pixels determined by the printer 200. This proves complete restoration of the positions of dot-on pixels. The arrangement of the first embodiment thus enables the printer 200 to accurately determine the positions of dot-on pixels, while ensuring quick transfer of the dot number data from the computer 100 to the printer 200. This leads to high-speed printing of a high-quality image.

B-5. Modified Examples

The procedure of the first embodiment may be modified in various ways. Some examples of possible modification are discussed briefly below.

(1) First Modified Example

As discussed above with reference to FIGS. 7 through 10, the number data generation process of the first embodiment converts image data into dot on-off state data of individual pixels, further converts the dot on-off state data into dot number data representing the number of dots to be created in each pixel group, and transfers the dot number data to the printer 200. Namely the computer 100 determines the dot on-off state with specification of dot-on pixel positions. The information on specification of dot-on pixel positions is, however, omitted from the transferred data, and only the information on the number of dots to be created in each pixel group is transferred to the printer 200. In view of such omission, the number data generation process executed in a first modified example thus generates only the dot number data representing the number of dots to be created in each pixel group without specification of dot-on pixel positions.

FIG. 13 shows the outline of the number data generation process executed in the first modified example. FIG. 13(a) shows a simplified dither matrix referred to in the number data generation process of the first modified example. The standard dither matrix referred to in the number data generation process of the first embodiment has the settings of threshold values corresponding to respective pixel positions (see FIG. 8). In the simplified dither matrix referred to in the first modified example, on the other hand, threshold values are not one-to-one mapped to the respective pixel positions but are collectively mapped to the respective pixel groups. Namely a set of multiple threshold values is one-to-one mapped to one pixel group. The number of multiple threshold values mapped to each pixel group is identical with the number of multiple pixels included in each pixel group. In the illustrated example of FIG. 13(a), a set of eight threshold values {255, 212, 177, 170, 109, 58, 42, 1} is mapped to a pixel group on the upper left corner of the simplified dither matrix. Similarly another set of eight threshold values {242, 223, 186, 161, 79, 70, 48, 5} is mapped to an adjacent pixel group on the right side.

The number data generation process of the first modified example compares the image data in each pixel group with a corresponding set of threshold values and thereby determines the number of dots to be created in each pixel without specification of dot-on pixel positions. For convenience of explanation, it is here assumed that target image data to be processed is identical with the example of image data processed in the first embodiment (see FIG. 6(b)). In the pixel group on the upper left corner of the image data, all the pixels have an identical tone value '97'. The pixel group at the corresponding position in the simplified dither matrix stores the set of eight threshold values {255, 212, 177, 170, 109, 58, 42, 1}. Among these eight threshold values, only three threshold values {58, 42, 1} are smaller than the tone value '97' of the pixel group. Namely three dots are to be created in this pixel group. Part of the threshold values are surrounded by the broken line in FIG. 13(b). This shows that these threshold values are smaller than the tone value of the pixel group. The set of multiple threshold values are stored corresponding to each pixel group and are compared with the tone value of the pixel group. This procedure readily determines the number of dots to be created in the pixel group without specifying the dot-on pixel positions in the pixel group. This series of processing is repeated for all the pixel groups and determines the numbers of dots to be created in the respective pixel groups as shown in FIG. 13(c).

The simplified dither matrix referred to in the first modified example is equivalent to the standard dither matrix referred to in the first embodiment. Each set of multiple threshold values stored corresponding to each pixel group in the simplified dither matrix of FIG. 13 is obtained by gathering threshold values stored at respective pixel positions in the dither matrix of FIG. 8 to one pixel group. Such equivalency of the simplified dither matrix to the standard dither matrix gives the same result of the dot number specification based on the simplified dither matrix without specification of dot-on pixel positions as the result of the dot number specification based on the standard dither matrix with specification of dot-on pixel positions. This is proved by the fact that the dot number data obtained by processing the image data with the standard dither matrix (see FIG. 10(a)) are perfectly matched with the dot number data obtained by processing the same image data with the simplified dither matrix (see FIG. 13(c)).

The procedure of the first modified example determines the number of dots to be created in each pixel group by simple comparison between the set of multiple threshold values stored corresponding to each pixel group and the tone value of the image data in the pixel group. This arrangement does not require comparison between the threshold values and the tone values of the image data at individual pixel positions in each pixel group, thus more quickly generating the dot number data representing the number of dots to be created in each pixel group.

The procedure of the first modified example specifies only the number of the threshold values that are smaller than the tone value of the image data in each pixel group. Arrangement of the threshold values in the order of magnitude in each pixel group further enhances the processing speed. In the illustrated example of FIG. 13, in the pixel group on the upper left corner, the tone value of the image data is equal to '97', while the set of the threshold values are arranged in the order of magnitude {255, 212, 177, 170, 109, 58, 42, 1}. These threshold values may be arranged either in a descending order or in an ascending order. The tone value of the image data varies in the range of 0 to 255, so that the tone value '97' is relatively small. This relatively small tone value is thus compared with the threshold values in the ascending order. The tone value '97' is first compared with the smallest threshold value '1' and is determined to be greater than the threshold value '1'. The tone value '97' is then compared with the adjacent second-smallest threshold value '42' and is also determined to be greater than the threshold value '42'. The tone value '97' is subsequently compared with the adjacent third-smallest threshold value '58'. In this manner, the tone value is successively compared with the threshold values in the ascending order. The tone value '97' is compared with the threshold value '109' and is determined to be smaller than the threshold value '109'. Since the threshold values in one pixel group are arranged in the order of magnitude, it is obvious that the subsequent threshold values are greater than the tone value once the threshold value exceeds the tone value. No further comparison is accordingly required. Although each pixel group stores eight threshold values, the dot number data is obtained by comparison of the tone value with only the four threshold values in this pixel group.

When the tone value of the image data is relatively large, on the other hand, the tone value is compared with the threshold values in the descending order. For example, when the tone value of the image data is '200' in the above example, the comparison with the tone value starts from the largest threshold value '255' and then goes to the adjacent second-largest threshold value '212', and the adjacent third-largest threshold value '177'. The dot number data in the pixel group is obtained by comparison of the tone value with only these three threshold values. As described above, storage of the threshold values in the order of magnitude in each pixel group ensures quick determination of the number of dots to be created in the pixel group.

(2) Second Modified Example

The pixel position determination process of the first embodiment discussed above receives the dot number data representing the number of dots to be created in each pixel group, refers to the dither matrix, and determines the positions of dot-on pixels in each pixel group (see FIG. 12). The threshold values of the individual pixels are, however, not essential for determination of the positions of dot-on pixels according to the dot number data. The only requirement is a priority order of the respective pixels in each pixel group for dot formation. In view of such requirement, the pixel position determination process in a second modified example refers to a matrix storing a priority order of pixels (hereafter referred to as the priority order matrix), instead of the dither matrix, to determine the positions of dot-on pixels.

Figures 14A, 14B, 14C:
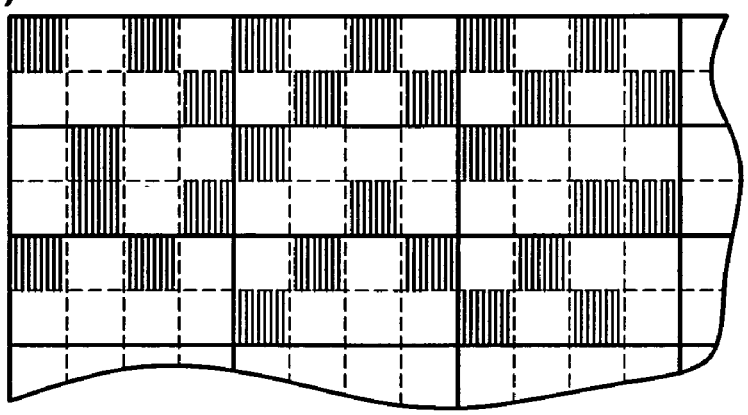
FIGS. 14(a) through 14(c) show a process of determining the positions of dot-on pixels according to the dot number data in a pixel position determination process of a second modified example of the first embodiment.

FIG. 14 conceptually shows determination of the positions of dot-on pixels according to a priority order matrix in the pixel position determination process of the second modified example. FIG. 14(a) shows a priority order matrix. Each rectangle of the thick solid line represents a pixel group. Each pixel group is divided into eight pixels as shown by the thin broken lines. The numerals shown in the respective pixels denote a priority order of the pixels in each pixel group for dot formation (that is, an order of dot formation).

Application of the priority order matrix facilitates determination of the positions of dot-on pixels according to the dot number data. The dot number data used for the description of this example are those shown in FIG. 12(a) and are identical with the dot number data used for the description of the pixel position determination process in the first embodiment. According to the dot number data of FIG. 12(a), the number of dots to be created in a pixel group on the upper left corner is 3. The procedure of the second modified example accordingly selects three pixels having first to third priority numbers in the upper left pixel group of the priority order matrix shown in FIG. 14(a) and determines the positions of dot-on pixels. FIG. 14(b) shows such selection of three pixels to determine the positions of dot-on pixels. The solid lines surrounding the numerals in the pixels mean that the pixels are selected. This series of processing is repeated with regard to all the pixel groups to determine all the positions of dot-on pixels as shown in FIG. 14(c). The squares filled with slant lines in FIG. 14(c) represent dot-on pixels.

The procedure of this modified example compares the priority number of each pixel included in a selected target pixel group with the dot number data representing the number of dots to be created in the pixel group. Selection of pixels having the priority numbers of not greater than the dot number data readily determines the positions of dot-on pixels in the pixel group. This method does not need to count up the number of pixels selected for dot formation according to the dot number data, thus facilitating determination of the positions of dot-on pixels.

The largest value stored in the priority order matrix (that is, the largest priority number allocated to the pixel) is the number of pixels included in one pixel group and is thus significantly smaller than the threshold values stored in the dither matrix. Namely the priority order matrix occupies a remarkably smaller storage capacity than the dither matrix. The printer executing the pixel position determination process may not have a sufficient storage capacity. The use of the priority order matrix to determine the positions of dot-on pixels advantageously saves the storage capacity of the printer.

The priority order matrix shown in FIG. 14(a) corresponds to the dither matrix referred to in the number data generation process for determination of the dot on-off state in the respective pixels. As mentioned previously with regard to the pixel position determination process of the first embodiment, the threshold values set in the dither matrix represent the priority order of dot formation. The priority order set in the priority order matrix shown in FIG. 14(a) is identical with the ascending order of the threshold values in the dither matrix allocated to the respective pixels in the pixel group. Setting the priority order matrix corresponding to the dither matrix referred to in the number data generation process ensures adequate determination of the positions of dot-on pixels according to the priority order matrix. As clearly understood from the comparison between FIG. 14(c) and FIG. 10(b), the positions of dot-on pixels determined according to the priority order matrix are completely matched with the positions of dot-on pixels according to the determination of the dot on-off state of the individual pixels. This proves adequate determination of the positions of dot-on pixels according to the priority order matrix.

As mentioned above, the number data generation process is required to specify only the number of dots to be created in each pixel group and does not demand information on the positions of dot-on pixels, that is, information regarding which pixels in each pixel group are dot-on pixels. The number data generation process may thus refer to the simplified dither matrix to generate the dot number data, instead of the standard dither matrix. The number data generation process based on the standard dither matrix specifies not only the number of dots to be created in each pixel group but the positions of dot-on pixels. Omission of the information on the positions of dot-on pixels from the standard dither matrix gives the simplified dither matrix. The modified number data generation process based on the simplified dither matrix thus specifies only the number of dots to be created in each pixel group.

The pixel position determination process receives the dot number data representing the number of dots to be created in each pixel group and is required to determine only the positions of dot-on pixels. The pixel position determination process may thus refer to the priority order matrix to determine the positions of dot-on pixels, instead of the standard dither matrix. Omission of the information used for specification of the number of dots to be created in each pixel group from the dither matrix gives the priority order matrix.

Both the simplified dither matrix and the priority order matrix have less information volumes than the standard dither matrix. The combination of the simplified dither matrix and the priority order matrix gives the equivalent volume of information to that of the standard dither matrix. Namely a simplified dither matrix and a priority order matrix can be generated corresponding to an original standard dither matrix of any arrangement. The generation of the dot number data according to the simplified dither matrix and the subsequent determination of the positions of dot-on pixels according to the priority order matrix ensure formation of dots in the identical arrangement with the result of dot formation according to the original standard dither matrix.

C. Second Embodiment

The procedure of the first embodiment discussed above divides one pixel into multiple smaller pixels and gathers the multiple smaller pixels as divisions of an identical original pixel to a pixel group. Division of one pixel into multiple smaller pixels is required, for example, when an image is printed at a higher resolution than the resolution of input image data. In the procedure of the first embodiment, the respective pixels included in one pixel group have an identical tone value. The technique of the invention is, however, also applicable to a pixel group of multiple pixels having different tone values. For example, when the printing resolution is set identical with the resolution of the input image data and one pixel group includes multiple pixels of image data, the multiple pixels included in the pixel group may have different tone values. In another example, when additional pixels are newly created for printing an image at a higher resolution than the resolution of input image data and the tone values of the newly created pixels are specified by interpolation, multiple pixels included in one pixel group have different tone values. In still another example, when the printing resolution is only slightly higher than the resolution of input image data and one pixel is divided into multiple smaller pixels, one pixel group may include smaller pixels as divisions of different original pixels. In such cases, the multiple pixels included in one pixel group may have different tone values. Application of the technique of the invention to such cases is described below as a second embodiment.

C-1. Number Data Generation Process in Second Embodiment

Figure 15:
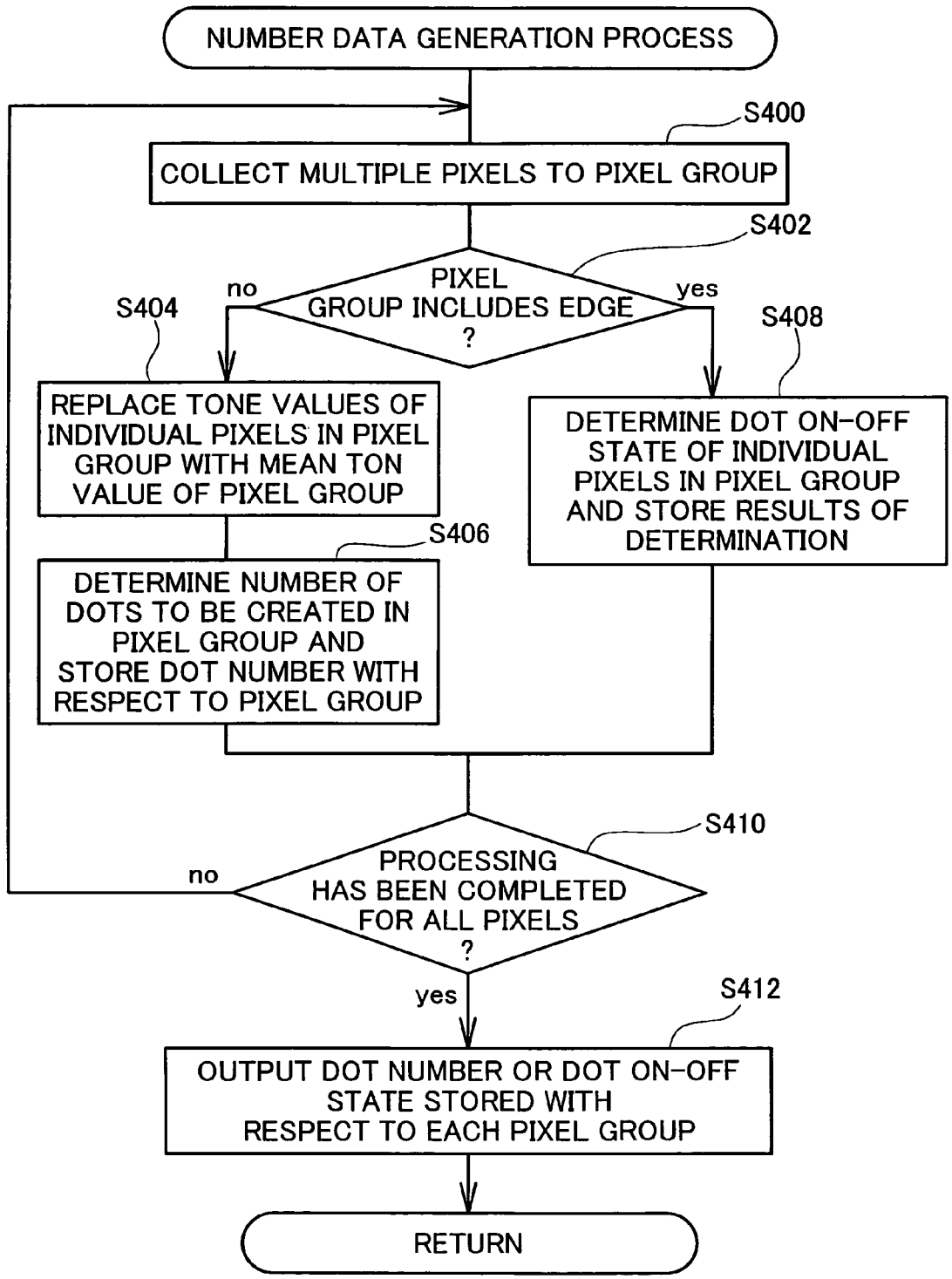
FIG. 15 is a flowchart showing the details of a number data generation process executed in a second embodiment.

FIG. 15 is a flowchart showing a number data generation process executed in the second embodiment. Like the number data generation process of the first embodiment, the number data generation process of the second embodiment is executed by the CPU of the computer 100 in the course of the image printing process shown in FIG. 5.

The number data generation process of the second embodiment first collects a predetermined number of multiple pixels to one pixel group (step S400). As in the description of the first embodiment, each pixel group includes eight pixels, that is, two rows in the horizontal direction and four columns in the vertical direction. This is only illustrative and not restrictive at all, and each pixel group may include any number of rows and any number of columns.

The number data generation process then determines whether the pixel group includes an edge (step S402). The procedure of this embodiment determines that the pixel group includes an edge when a tone difference between a largest tone value and a smallest tone value among the tone values allocated to the multiple pixels included in the pixel group is not less than a preset level. This method is, however, not restrictive at all, and any other suitable method is applicable to detection of an edge.

When it is determined that no edge is included in the pixel group (step S402: no), the process calculates a mean tone value of the pixel group and replaces the tone values of the respective pixels in the pixel group with the calculated mean tone value (step S404). The respective pixels included in one pixel group accordingly have an identical tone value. The number of dots to be created in the pixel group is thus determined according to the same procedure as the first embodiment described above.

FIG. 16 shows replacement of the tone values of the respective pixels in each pixel group with the mean tone value in the case of detection of no edge in the pixel group. FIG. 16(a) shows tone values allocated to respective pixels in pixel groups. A pixel group on the upper left corner has a maximum tone value '100' and a minimum tone value '97'. There is a relatively small tone difference of '3'. A lower right pixel group, on the other hand, has a maximum tone value '132' and a minimum tone value '99'. There is a significantly large tone difference of '33'. One concrete procedure presets an adequate threshold value (for example, a tone value '20') and detects the presence of an edge in one pixel group when the tone difference in the pixel group is greater than the preset threshold value. The procedure detects no edge in the pixel group when the tone difference in the pixel group is smaller than the preset threshold value. In response to detection of no edge, the procedure calculates the mean tone value of the pixel group and replaces the tone values of all the pixels included in the pixel group with the calculated mean tone value.

FIG. 16(b) shows replacement of the tone values of the respective pixels included in one pixel group with the calculated mean tone value, in response to detection of no edge in the pixel group. In the illustrated example, the upper left pixel group, an adjacent pixel group on the right, and another adjacent pixel group immediately below have relatively small tone differences. All the pixels in the respective pixel groups are thus replaced by the individually calculated mean tone values '99', '103', and '94'. With regard to each pixel group having the tone values of the respective pixels replaced with the mean tone value, all the pixels in the pixel group have the identical tone value. The process thus determines the number of dots to be created in such a pixel group according to the procedure of the first embodiment discussed above (step S406 in the flowchart of FIG. 15). The lower right pixel group, on the other hand, has a relatively large tone difference of '33', which detects the presence of an edge. The process does not replace the tone values with the mean tone value in this pixel group but compares the tone values of the individual pixels in the pixel group with the corresponding threshold values in the dither matrix to determine the dot on-off state of the respective pixels (see FIG. 9) and stores the results of determination regarding the dot on-off state of the respective pixels (step S408 in FIG. 15).

After conclusion of the processing with regard to one pixel group, the process subsequently determines whether the processing has been completed with regard to all the pixels included in image data (step S410). When there is any unprocessed pixel (step S410: no), the process returns to step S400 to set a next target pixel group of multiple pixels and repeats the subsequent series of processing. When all the pixels have been collected to pixel groups and processed (step S410: yes), the process outputs the dot number data, which have been stored at step S406, with regard to the pixel groups with no edge to the printer 200, while outputting the dot on-off state data of individual pixels, which have been stored at step S408, with regard to the pixel groups with an edge to the printer 200 (step S412). Namely the dot number data of the respective pixel groups and the dot on-off state data of the individual pixels in the pixel groups are simultaneously output to the printer 200. The number data generation process of the second embodiment outputs these data in the following formats to discriminate the dot number data from the dot on-off state data of the individual pixels.

FIG. 17 shows the formats of the data output from the computer 100 to the printer 200 in the second embodiment. The dot number data representing the number of dots to be created in each pixel group are output as 4-bit data with regard to each pixel group as shown in FIG. 17(a). Each pixel group includes eight pixels, so that the dot number varies only in the range of 0 to 8. The data capacity of 4 bits is thus sufficient to express the number of dots. The dot on-off state data representing the dot on-off state of the individual pixels are output in the format shown in FIG. 17(b). The first four bits express a value selected in a range of 9 to 15 (the value '9' in the illustrated example of FIG. 17(b)), and the subsequent eight bits express the settings of the dot on-off state of the individual pixels. Since the dot number varies only in the range of 0 to 8, setting the value of or over 9 in the 4-bit data head means that the subsequent 8-bit data does not show the dot number but represents the dot on-off state of the individual pixels. The respective bits of the 8-bit data may be allocated to the individual pixels, for example, in an order of FIG. 17(c). The dot on-off state data representing the dot on-off state of respective pixels in each pixel group are output in this format. In the case of application of the formats of FIG. 17 to the data output, 4-bit dot number data are transferred to the printer 200 with regard to the pixel groups with no edge, while 12-bit dot on-off state data are transferred to the printer 200 with regard to the pixel groups with an edge.

This method is, however, not restrictive at all, and any other suitable method may be applied to output the dot number data and the dot on-off state data of the individual pixels simultaneously. One applicable method may additionally use an identification bit. For example, the identification bit set equal to '0' means that subsequent 4-bit data is dot number data as shown in FIG. 18(a), whereas the identification bit set equal to '1' means that subsequent 8-bit data is dot on-off state data of individual pixels as shown in FIG. 18(b). In the case of application of the formats of FIG. 18 to the data output, 5-bit dot number data are transferred to the printer 200 with regard to the pixel groups with no edge, while 9-bit dot on-off state data are transferred to the printer 200 with regard to the pixel groups with an edge.

As clearly understood from the comparison between the data transfer method of FIG. 17 and the data transfer method of FIG. 18, with regard to pixel groups with no edge, the volume of data transfer according to the method of FIG. 17 is less than that according to the method of FIG. 18. With regard to pixel groups with an edge, on the other hand, the volume of data transfer according to the method of FIG. 18 is less than that according to the method of FIG. 17. In the case of a high ratio of pixel groups with an edge, the method of FIG. 18 with the identification bit is suitable for the data transfer. In the case of a low ratio of pixel groups with an edge, on the other hand, the method of FIG. 17 is suitable for the data transfer. The pixel groups with an edge generally occupy a relatively low ratio, so that the method of FIG. 17 is preferable to attain the quicker data transfer.

As described above, the dot number data of the respective pixel groups and the dot on-off state data of the individual pixels are simultaneously output to the printer 200 at step S412 in the flowchart of FIG. 15. On completion of data output with regard to all the pixel groups, the program exits from the number data generation process of the second embodiment shown in FIG. 15 and returns to the image printing routine.

C-2. Pixel Position Determination Process in Second Embodiment

As described above, in the procedure of the second embodiment, the dot number data and the dot on-off state data of the individual pixels are sent simultaneously from the computer 100. The printer 200 determines the positions of dot-on pixels according to the following method. In the description below, it is assumed that the formats of FIG. 17 are adopted for the data transfer.

Figure 19:
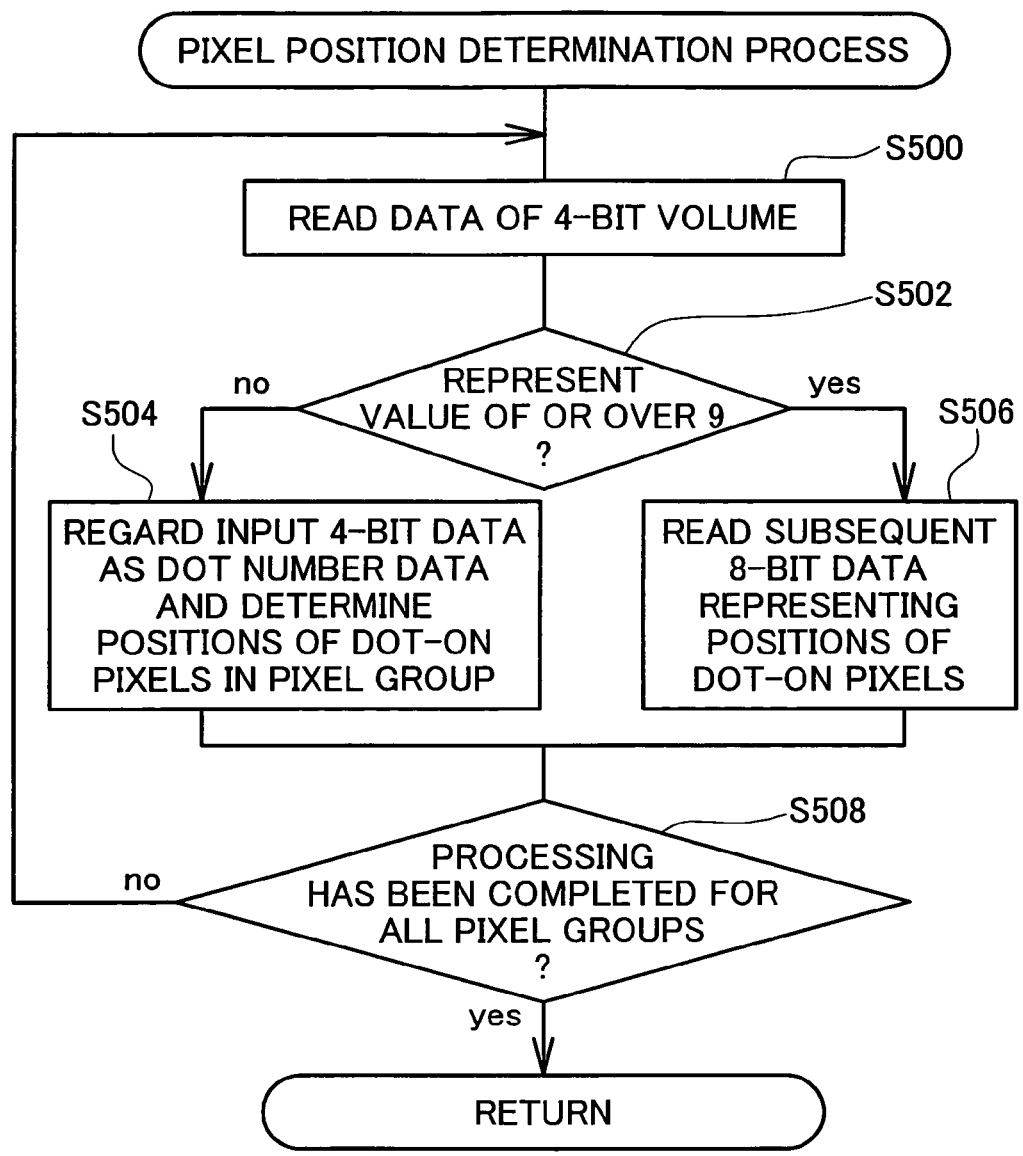
FIG. 19 is a flowchart showing the details of a pixel position determination process executed in the second embodiment.

FIG. 19 is a flowchart showing a pixel position determination process executed in the second embodiment to determine the positions of dot-on pixels. The pixel position determination process first inputs data of the 4-bit volume (step S500) and determines whether the input 4-bit data represents a value of or over 9 (step S502). As mentioned above, each pixel group includes eight pixels, and the dot number varies only in the range of 0 to 8. When the input 4-bit data represents a value of or over 9, it is determined that the input data is not the dot number data but the subsequent data is dot on-off state data of individual pixels. When the input 4-bit data represents a value of or below 8, on the other hand, it is determined that the input data is the dot number data representing the number of dots to be created in one pixel group.

When the input 4-bit data does not represent a value of or over 9 (step S502: no), the process regards the input 4-bit data as dot number data and determines the positions of dot-on pixels in the pixel group according to the same procedure as that of the first embodiment (step S504). When the input 4-bit data represents a value of or over 9 (step S502: yes), on the other hand, the process reads the subsequent 8-bit data and regards the subsequent 8-bit data as the dot on-off state data of the individual pixels to determine the positions of dot-on pixels (step S506).

After determination of the positions of dot-on pixels in one pixel group, it is determined whether the processing has been completed with regard to all the pixel groups (step S508). When there is any unprocessed pixel group, the pixel position determination process returns to step S500 and repeats the subsequent series of processing with respect to a next pixel group. The above series of processing is repeated until the positions of dot-on pixels are determined with regard to all the pixel groups. On conclusion of the processing with regard to all the pixel groups, the program exits from the pixel position determination process of the second embodiment shown in FIG. 19 and returns to the image printing routine.

The image printing process of the second embodiment executes the number data generation process shown in FIGS. 15 through 18 and the pixel position determination process shown in FIG. 19. Even when multiple pixels included in one pixel group have different tone values, the image printing process of the second embodiment transfers the dot number data with regard to the pixel groups with no edge. This arrangement ensures quick data transfer to the printer 200 and thereby high-speed image printing.

The image printing process of the second embodiment transfers the dot on-off state data of the individual pixels with regard to the pixel groups with an edge. An increase in ratio of the pixel groups with an edge extends the time required for data transfer to the printer 200. One possible measure elevates the criterion for detection of edges and thereby reduces the potential for edge detection. This shortens the time required for data transfer and thereby enables high-speed image printing. With regard to the pixel groups with no edge, on the other hand, the tone values of the individual pixels in the pixel group are replaced with the calculated mean tone value. The excessive elevation of the criterion for edge detection (the excessively reduced potential for edge detection) to shorten the time of data transfer may lead to deterioration of the printing quality.

When the high picture quality is demanded for a resulting printed image, the printing resolution is typically set higher than the resolution of the input image data. Enhancement of the resolution is attained by division of original pixels into smaller pixels according to the resolution conversion process (step S104 in the flowchart of FIG. 5) or by interpolation for creation of additional pixels. In either case, the tone value gently varies in most pixel groups. In the image with the demand for the high printing quality, no edge is thus detected in most pixel groups even without elevation of the criterion for edge detection. This ensures quick data transfer with keeping the demanded high printing quality.

When the demanded printing resolution is not so high but is substantially equivalent to the resolution of the input image data, on the other hand, there is a high potential for edge detection in respective pixel groups. Elevation of the criterion for the reduced potential for edge detection is thus required to shorten the time of data transfer to the printer 200. In the case of setting the printing resolution to a relatively low level, the user generally gives preference to the high-speed printing over the printing quality. The relatively poor picture quality due to the elevated criterion for edge detection accordingly does not cause any significant problem.

D. Third Embodiment

In the first and the second embodiments discussed above, each pixel takes only either of the two tone values corresponding to the dot-on state and the dot-off state. Some printers may, however, be capable of varying the size of dots or varying the density of ink used for dot formation to express a greater number of tone values in individual pixels. The technique of the invention is effectively applicable to such multi-valued printers. Application of the technique of the invention to a multi-valued printer is described below as a third embodiment.

D-1. Schema of Image Printing Process in Third Embodiment

Figure 20:
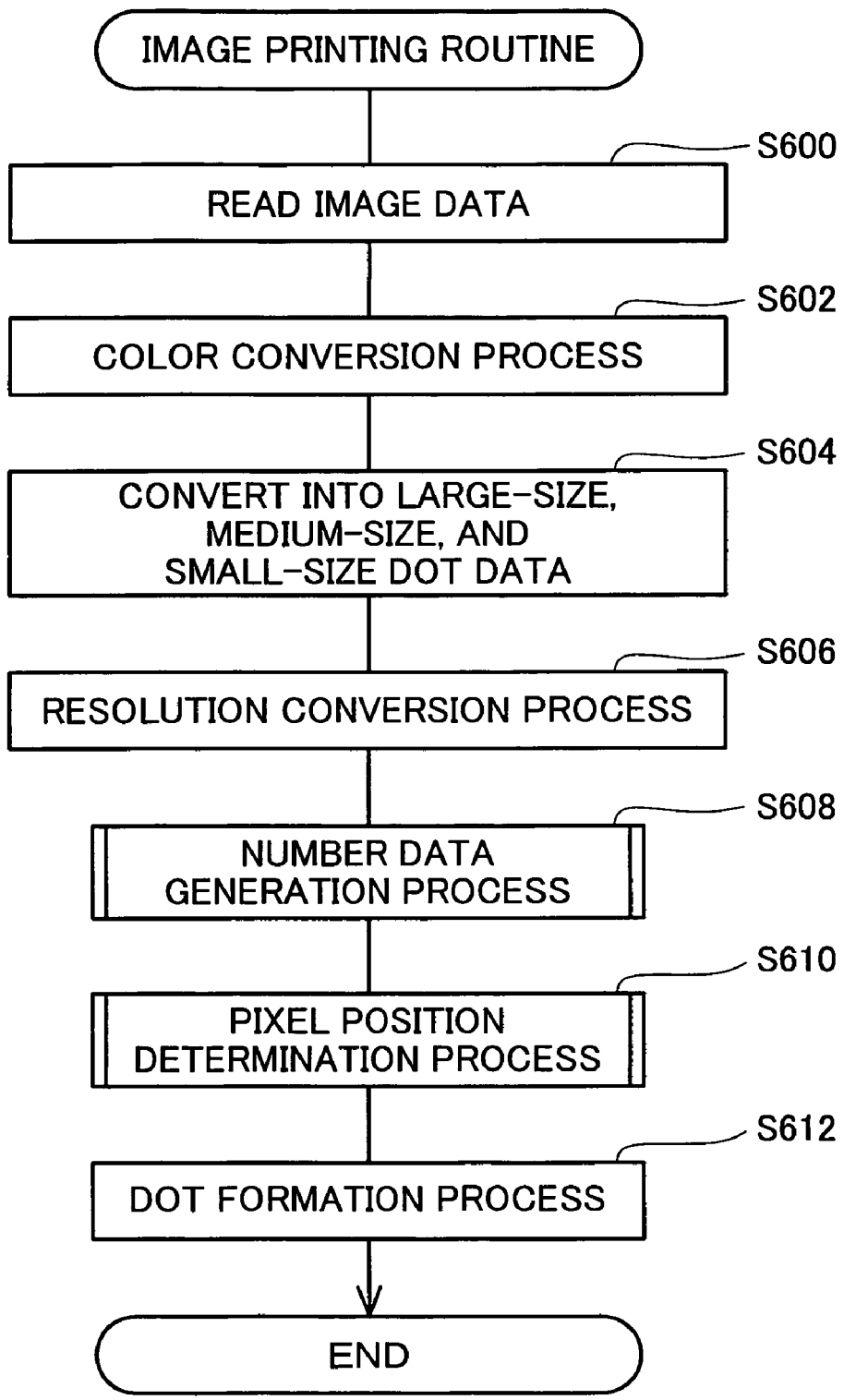
FIG. 20 is a flowchart showing an image printing routine executed in a third embodiment.

FIG. 20 is a flowchart showing an image printing routine executed in the third embodiment. The primary difference of the image printing process of the third embodiment from the image printing process of the first embodiment discussed above with reference to FIG. 5 is conversion of color-converted data into large-size, medium-size, and small-size dot data. The image printing process of the third embodiment is described below with the focus on such difference. Here the printer 200 is the multi-valued printer that is capable of varying the size of dots. The following description is, however, similarly applicable to the multi-valued printer that is capable of varying the density of ink instead of the dot size and to the multi-valued printer that is capable of varying both the dot size and the density of ink.

Like the image printing routine of the first embodiment, the image printing routine of the third embodiment reads object image data to be converted (step S600) and makes the input image data subjected to color conversion (step S602). The color conversion process converts the input image data into tone data expressed by the tone values of the respective colors C, M, Y, and K.

The printer 200 of the first embodiment discussed above is not capable of varying the dot size but takes only either of the two states, the dot-on state or the dot-off state, with regard to each color. The image printing process of the first embodiment thus determines the dot on-off state in the individual pixels immediately after the color conversion. The printer 200 of the third embodiment, however, is capable of varying the dot size and creating three different size dots, that is, the large-size dot, the medium-size dot, and the small-size dot. The image printing process of the third embodiment thus converts the tone data obtained by the color conversion into large-size dot data, medium-size dot data, and small-size dot data with regard to each color (step S604).

Figure 21:
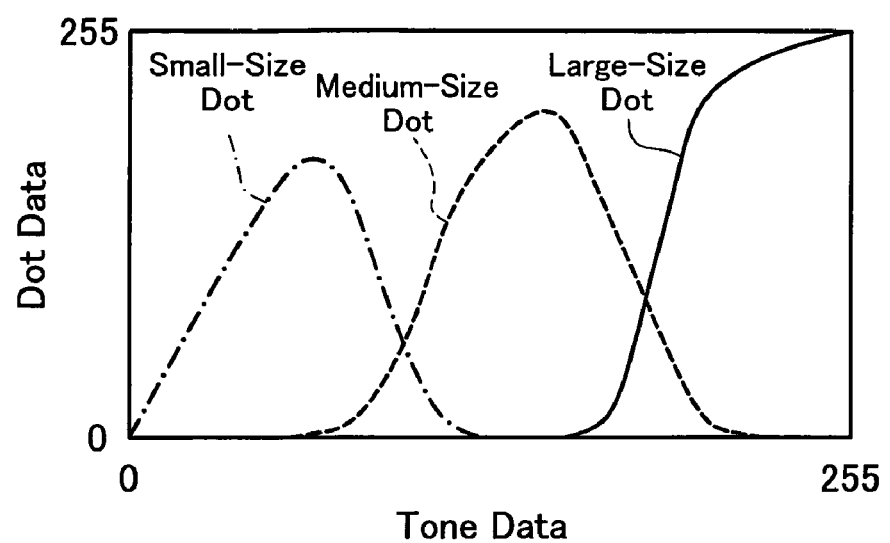
FIG. 21 conceptually shows a conversion table referred to in a conversion process to large-size, medium-size, and small-size dot data in the third embodiment.

A conversion table shown in FIG. 21 is used for conversion of the tone data into the large-size dot data, the medium-size dot data, and the small-size dot data. The conversion table stores variations in large-size dot data, medium-size dot data, and small-size dot data against the tone data. The tone data after color conversion is further converted by referring to this conversion table.

The large-size dot data, the medium-size dot data, and the small-size dot data respectively go through a resolution conversion process (step S606). Any of diverse methods is applicable to the resolution conversion process. For the simplicity of explanation, the technique of dividing original pixels into smaller pixels is adopted for the resolution conversion like the first embodiment. The tone value allocated to each original pixel is set to all the smaller pixels as divisions of the original pixel.

After conversion of the input resolution into the printing resolution, the resolution-converted data goes through a number data generation process (step S608). In the structure of the third embodiment, the printer 200 is capable of creating the three different size dots, that is, the large-size dot, the medium-size dot, and the small-size dot. The number data generation process of the third embodiment thus generates dot number data with regard to the three different size dots and outputs the generated dot number data to the printer 200.

FIG. 22 shows a process of generating dot number data from dot data according to the number data generation process of the third embodiment. FIG. 22(*a*) shows settings of dot data with regard to the large-size, medium-size, and small-size dots to the individual pixels included in each pixel group. Each solid rectangle represents one pixel group. Each pixel group includes a predetermined number of multiple pixels, and dot data are actually set to each of the multiple pixels. For the graphic simplicity, however, the individual pixels are omitted from the illustration, and the dot data are set to each pixel group in the illustration. For example, the expression of Data(L,M,S)=(2,90,32) in a pixel group on the upper left corner of FIG. 22(*a*) means that the large-size dot data '2', the medium-size dot data '90', and the small-size dot data '32' are set to the individual pixels included in this pixel group. As mentioned above in relation to the first embodiment, when all the pixels included in each pixel group have an identical tone value, the resolution conversion process may be omitted and the number data generation process may take charge of the substantial resolution conversion.

The number data generation process of the third embodiment processes the dot data with regard to the respective size dots and generates dot number data as shown in FIG. 22(*b*). As in the representation of FIG. 22(*a*), each solid rectangle in FIG. 22(*b*) represents a pixel group, which includes a predetermined number of multiple pixels. The individual pixels are omitted from the illustration, and the dot number data are generated with respect to each pixel group. For example, the expression of Dot(L,M,S)=(1,2,1) in the pixel group on the upper left corner of FIG. 22(*b*) means that the dot number data '1', '2', and '1' are generated respectively as the dot numbers of the large-size dot, the medium-size dot, and the small-size dot to be created in this pixel group. The details of the number data generation process of the third embodiment will be discussed later.

The printer 200 receives the dot number data output from the computer 100 and carries out a pixel position determination process (step S610). Since the structure of the third embodiment creates the three different size dots, that is, the large-size dot, the medium-size dot, and the small-size dot, the pixel position determination process determines the positions of dot-on pixels with regard to these three different size dots. The details of the pixel position determination process of the third embodiment will be discussed later.

After determination of the pixel positions for dot formation, the printer 200 repeats the main scans and the sub-scans of the carriage 240 and drives the ink ejection heads to create the large-size dots, the medium-size dots, and the small-size dots on the printing paper (step S612). A resulting image corresponding to image data is thus printed on the printing paper.

D-2. Number Data Generation Process in Third Embodiment

Figure 23:
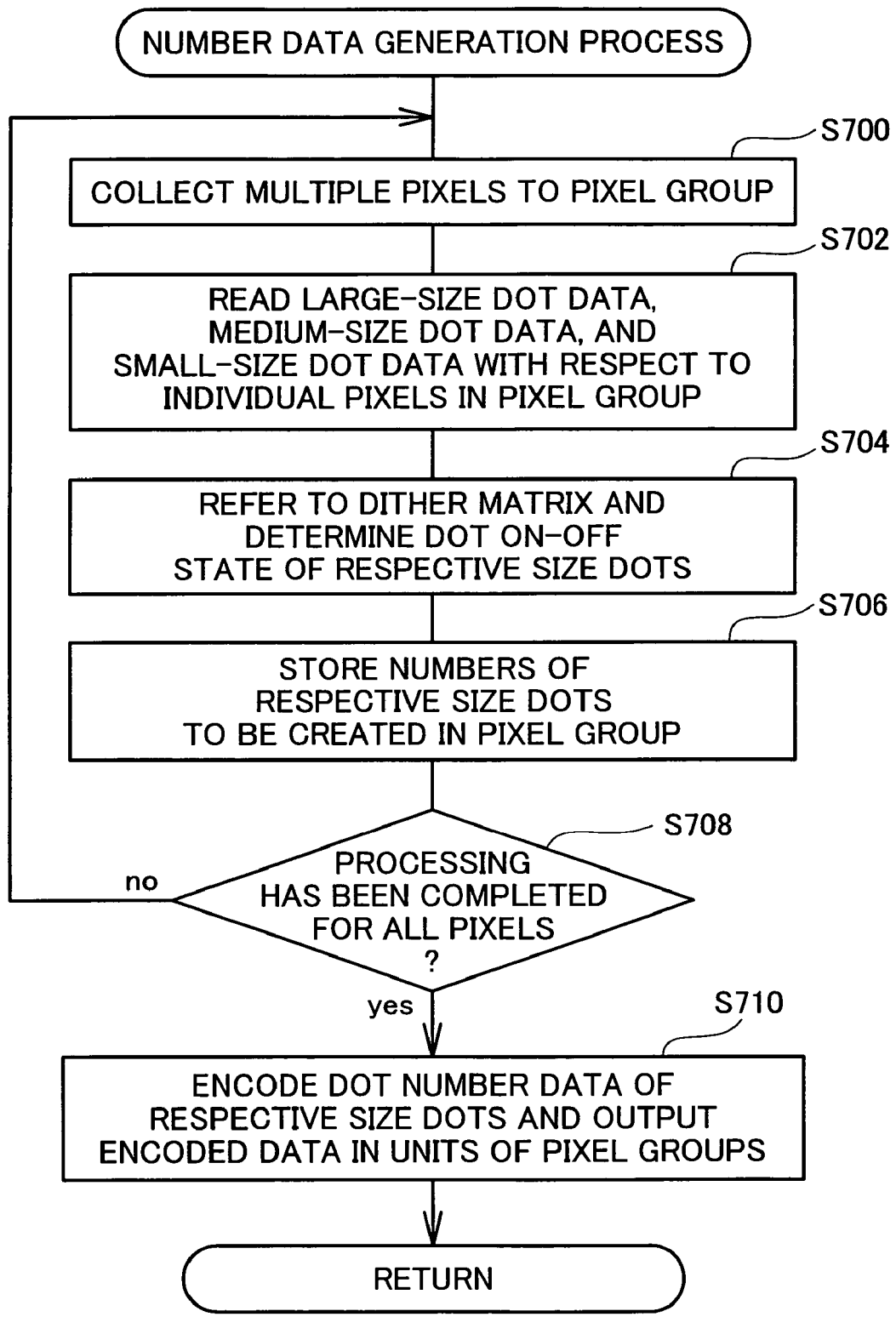
FIG. 23 is a flowchart showing the details of the number data generation process executed in the third embodiment.

The following describes the details of the number data generation process of the third embodiment. FIG. 23 is a flowchart showing the details of the number data generation process in the third embodiment executed by the CPU of the computer 100.

When the number data generation process of the third embodiment starts, the CPU first collects a predetermined number of multiple pixels in the input image data to one pixel group (step S700). The resolution conversion process (step S606 in the flowchart of FIG. 20) prior to the number data generation process has divided each original pixel into smaller pixels, as in the procedure of the first embodiment. Multiple smaller pixels as divisions of one identical pixel are thus gathered to one pixel group.

The process then reads the large-size dot data, the medium-size dot data, and the small-size dot data with respect to the individual pixels in the pixel group (step S702). The individual pixels included in the pixel group are divisions of an identical original pixel and have an identical tone value. The process may thus read the dot data of only one pixel in the pixel group, instead of reading the dot data of all the individual pixels in the pixel group.

Figure 24:
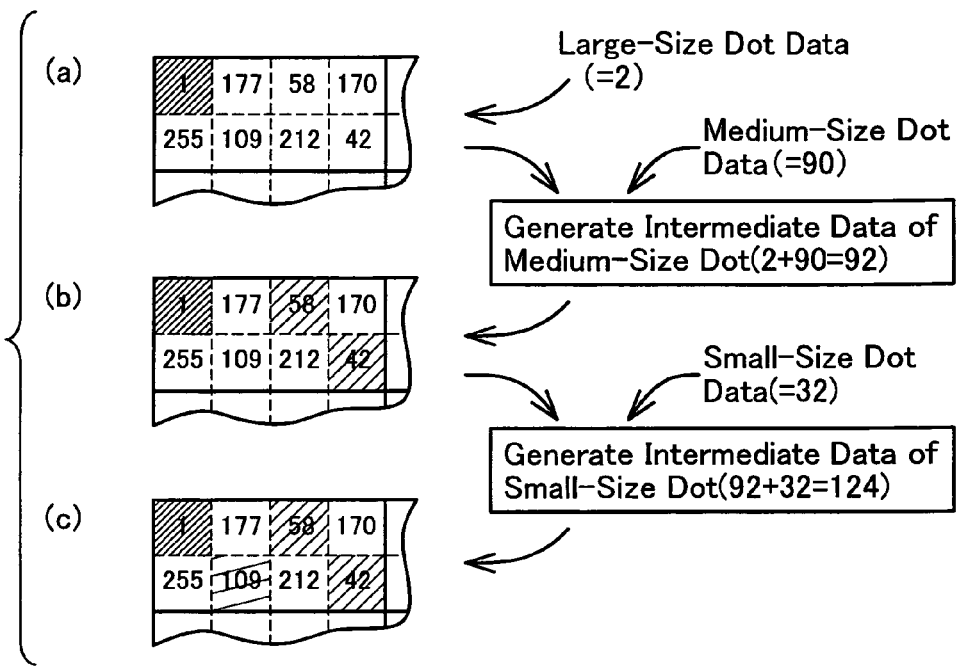
FIG. 24 shows a process of determining the positions of dot-on pixels of respective size dots by referring to the dither matrix.

After reading the dot data regarding the respective size dots, the process refers to a dither matrix to determine the dot on-off state with respect to the large-size dot, the medium-size dot, and the small-size dot (step S704). FIG. 24 shows a method of determining the dot on-off state of the large-size dot, the medium-size dot, and the small-size dot in each target pixel by referring to the dither matrix. In the illustrated example of FIG. 24, the dot data to be processed and the dither matrix referred to are respectively those shown in FIG. 22(a) and shown in FIG. 8.

FIG. 24 shows a process of determining the dot on-off state of the three different size dots in a pixel group on the upper left corner of an image. Each rectangle of the thick solid line represents one pixel group, and the divisions of the pixel group by the thin broken lines represent multiple pixels constituting the pixel group. The numeral shown in each pixel is a threshold value set at the corresponding position in the dither matrix.

The method of determining the dot on-off state first compares the large-size dot data with the threshold values set at the corresponding positions in the dither matrix. When the large-size dot data is greater than the corresponding threshold value in a target pixel, a large-size dot is to be created in the target pixel. FIG. 24(a) shows determination of the large-size dot on-off state with regard to the individual pixels in the pixel group. The large-size dot data is '2' in this pixel group. Only in the upper left pixel having the corresponding threshold value '1' of the dither matrix, the large-size dot data '2' is greater than the threshold value. The corresponding threshold values of the dither matrix are greater than the large-size dot data '2' in all the other pixels. Namely only one large-size dot is to be created in this pixel group. The pixel having the threshold value '1' of the dither matrix is filled with dense slant lines in FIG. 24(a). This expresses expected formation of a large-size dot in this pixel.

On completion of determination of the large-size dot on-off state, the method subsequently determines the medium-size dot on-off state. The method adds the medium-size dot data to the large-size dot data to generate intermediate data of the medium-size dot and compares the intermediate data of the medium-size dot with the threshold values set at the corresponding positions in the dither matrix. When the intermediate data of the medium-size dot is greater than the corresponding threshold value in a target pixel, a medium-size dot is to be created in the target pixel. The pixel specified for expected formation of a large-size dot is omitted from the object of determination of the medium-size dot on-off state. In the concrete example of FIG. 24(b), summation of the large-size dot data '2' and the medium-size dot data '90' gives the intermediate data '92' of the medium-size dot. This intermediate data '92' of the medium-size dot is compared with the corresponding threshold values in the dither matrix. The upper left pixel in the pixel group has been determined as the large-size dot-on pixel and is thus omitted from the object of comparison. In the pixels having the corresponding threshold values '42' and '58' of the dither matrix, the intermediate data '92' of the medium-size dot is greater than the respective threshold values. Medium-size dots are thus to be created in these pixels. These pixels are filled with slant lines in FIG. 24(b). This expresses expected formation of medium-size dots in these pixels.

On completion of determination of the medium-size dot on-off state, the method determines the small-size dot on-off state. The method adds the small-size dot data to the intermediate data of the medium-size dot to generate intermediate data of the small-size dot and compares the intermediate data of the small-size dot with the corresponding threshold values of the dither matrix with respect to the remaining pixels that have not been specified as dot-on pixels. When the intermediate data of the small-size dot is greater than the corresponding threshold value in a target pixel, a small-size dot is to be created in the target pixel. In the concrete example of FIG. 24(c), summation of the intermediate data '92' of the medium-size dot and the small-size dot data '32' gives the intermediate data '124' of the small-size dot. This intermediate data '124' of the small-size dot is compared with the corresponding threshold values in the dither matrix. In the pixel having the corresponding threshold value '109' of the dither matrix, the intermediate data '124' of the small-size dot is greater than the threshold value. A small-size dot is thus to be created in this pixel, which is filled with sparse slant lines in FIG. 24(c). This expresses expected formation of a small-size dot in this pixel. The process determines the dot on-off state of the large-size dot, the medium-size dot, and the small-size dot with respect to the individual pixels in the pixel group in the above manner at step S704 in the flowchart of FIG. 23.

After determination of the dot on-off state with regard to the respective size dots, the process stores the numbers of the respective size dots to be created in the pixel group (step S706). In the illustrated example of FIG. 24, one large-size dot, two medium-size dots, and one small-size dot are stored as the numbers of the respective size dots to be created in the pixel group.

After storage of the numbers of the respective size dots to be created in the pixel group having the predetermined number of multiple pixels, the process determines whether the processing has been completed with regard to all the pixels included in the input image data (step S708). When there is any unprocessed pixel (step S708: No), the process returns to step S700 to set a next pixel group and repeats the subsequent series of processing. When the processing has been completed with regard to all the pixels included in the input image data (step S708: Yes), the process outputs the numbers of the respective size dots stored in units of pixel groups to the printer 200 (step S710). For further reduction of the data volume output to the printer 200, the dot number data of the respective size dots are encoded as discussed below.

FIG. 25 conceptually shows a conversion table referred to for encoding the dot number data of the respective size dots. The conversion table stores settings of code numbers allocated to respective combinations of the numbers of the large-size dot, the medium-size dot, and the small-size dot. For example, a code number '0' is allocated to a combination of the numbers of the large-size dot, the medium-size dot, and the small-size dot all equal to 0. A code number '1' is allocated to a combination of the number of the small-size dot equal to 1 and the numbers of the large-size dot and the medium-size dot both equal to 0.

Output of the code number representing the numbers of the respective size dots to the printer 200 desirably reduces the output data volume. The reason of data volume reduction is described briefly. Each pixel group consists of 8 pixels, and the maximum number of each size dot is accordingly 8. The dot number data of each size dot accordingly requires a 4-bit data volume. There are three different size dots, so that each pixel group requires a 12-bit data volume. The code numbers range from 0 to 164 as shown in FIG. 25. Each pixel group accordingly requires only an 8-bit data volume for the encoded data. Such encoding thus readily reduces the required data volume to ⅔.

The combinations of the numbers of the respective size dots include many unpractical combinations for actual printing. Allocation of code numbers to these unpractical combinations is naturally not required. Allocation of the code numbers to only practical combinations further reduces the required data volume of each pixel group to be less than 8 bits.

The process encodes the dot number data of the respective size dots and outputs the encoded data to the printer 200 at step S710 in the flowchart of FIG. 23, on this account. After output of the encoded dot number data of the respective size dots in units of pixel groups to the printer 200, the program terminates the number data generation process of the third embodiment and returns to the image printing routine of FIG. 20.

Figure 26:
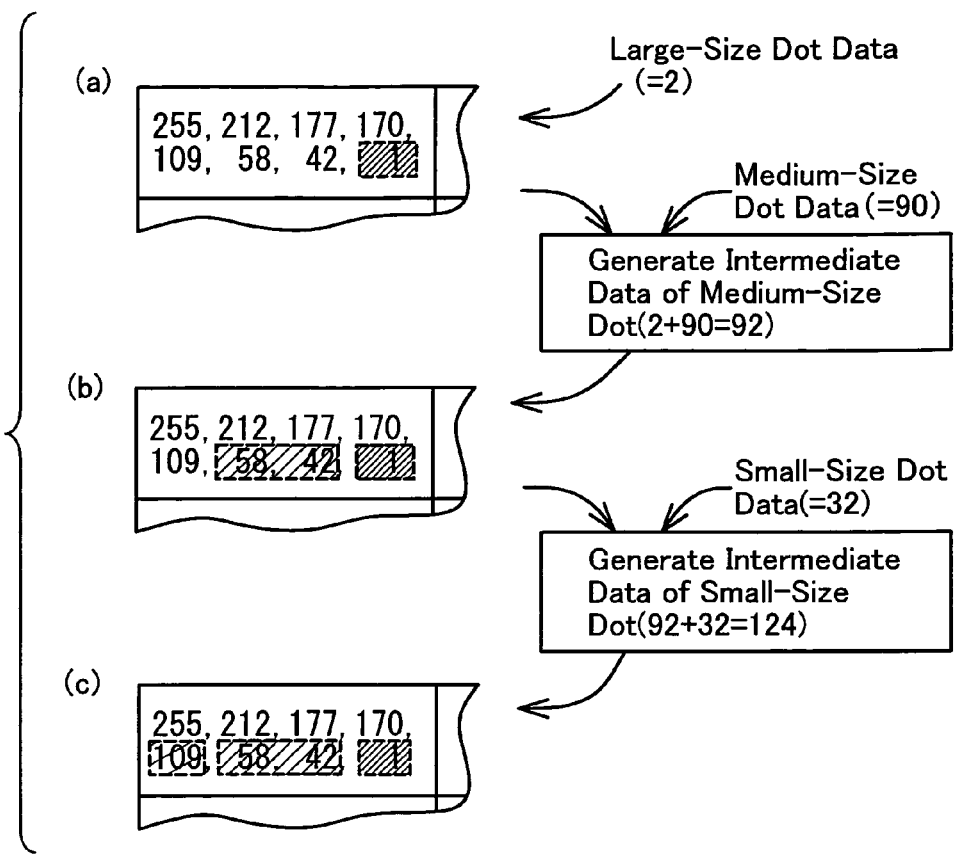
FIG. 26 conceptually shows a process of determining the numbers of the respective size dots without specification of dot-on pixel positions in the number data generation process of the third embodiment.

The number data generation process of the third embodiment discussed above determines the dot on-off state of the respective size dots with specification of dot-on pixel positions. The information on specification of dot-on pixel positions is, however, omitted from the transferred data, and only the information on the numbers of the respective size dots to be created in each pixel group is transferred to the printer 200. In view of such omission, the number data generation process may determine the numbers of the respective size dots without specification of dot-on pixel positions, like the first modified example of the first embodiment described above (see FIG. 13). FIG. 26 conceptually shows a process of determining the numbers of the respective, size dots without specification of dot-on pixel positions.

The process of FIG. 26 determines the numbers of the respective size dots without specification of the dot-on pixel positions in the pixel group of FIG. 24. A simplified dither matrix is applicable to determine the numbers of multiple different size dots, as in the case of determination of the number of a single size dot. As described previously, while the standard dither matrix stores the threshold values one-to-one mapped to the respective pixel positions, the simplified dither matrix stores the threshold values that are not one-to-one mapped to the respective pixel positions but are collectively mapped to the respective pixel groups. Namely a set of multiple threshold values is one-to-one mapped to one pixel group in the simplified dither matrix. For example, the threshold values in the dither matrix are one-to-one mapped to the respective pixels in the pixel group shown in FIG. 24. In the simplified dither matrix of FIG. 26, on the other hand, a set of threshold values {255, 212, 177, 170, 109, 58, 42, 1} is one-to-one mapped to the pixel group. The following describes the method of determining the numbers of the respective size dots without specification of dot-on pixel positions according to the example of FIG. 26.

This modified method sequentially determines the number of the large-size dot, the number of the medium-size dot, and the number of the small-size dot in this order. FIG. 26(*a*) shows determination of the number of the large-size dot, FIG. 26(*b*) shows determination of the number of the medium-size dot, and FIG. 26(*c*) shows determination of the number of the small-size dot. The method first compares the large-size dot data with a set of threshold values mapped to a pixel group. The number of the threshold values smaller than the large-size dot data is given as the number of the large-size dot to be created in this pixel group. In the illustrated example of FIG. 26(*a*), the large-size dot data is '2', and there is only one threshold value smaller than this large-size dot data '2'. The number of the large-size dot to be created in this pixel group is accordingly 1. The threshold value '1' is covered with dense slant line in FIG. 26(*a*). This expresses expected formation of a large-size dot for this threshold value.

After determination of the number of the large-size dot, the method adds the medium-size dot data to the large-size dot data to generate intermediate data of the medium-size dot and compares the intermediate data of the medium-size dot with the set of threshold values. The number of the threshold values smaller than the intermediate data of the medium-size dot is given as the number of the medium-size dot to be created in this pixel group. The threshold value set for formation of the large-size dot is omitted from the object of such comparison. In the illustrated example of FIG. 26(*b*), summation of the large-size dot data '2' and the medium-size dot data '90' gives the intermediate data '92' of the medium-size dot. Except the threshold value '1' set for formation of the large-size dot, there are two threshold values smaller than the intermediate data '92' of the medium-size dot. The number of the medium-size dot to be created in this pixel group is accordingly 2. The threshold values '42' and '58' are covered with slant lines in FIG. 26(*b*). This expresses expected formation of medium-size dots for these threshold values.

After determination of the number of the medium-size dot, the method adds the small-size dot data to the intermediate data of the medium-size dot to generate intermediate data of the small-size dot and compares the intermediate data of the small-size dot with the set of threshold values to determine the number of the small-size dot to be created in the pixel group. In the illustrated example of FIG. 26(*c*), summation of the intermediate data '92' of the medium-size dot and the small-size dot data '32' gives the intermediate data '124' of the small-size dot. Among the remaining threshold values that have not been set for dot formation, there is only one threshold value smaller than the intermediate data '124' of the small-size dot. The number of the small-size dot to be created in this pixel group is accordingly 1. The threshold value '109' is covered with sparse slant lines in FIG. 26(*c*). This expresses expected formation of a small-size dot for this threshold value.

This modified method refers to the simplified dither matrix and determines the numbers of the respective size dots without specification of dot-on pixel positions. The numbers of the respective size dots are determined by simple comparison of the dot data or the intermediate data with the set of threshold values. This method does not require comparison between the dot data with the individual threshold values allocated to the respective pixels. This ensures quicker generation of the dot number data with regard to the respective size dots.

D-3. Pixel Position Determination Process of Third Embodiment

As described above, the number data generation process of the third embodiment generates the dot number data representing the numbers of the respective size dots to be created in each pixel group and transfers the dot number data to the printer 200. The printer 200 receives the transferred data, determines the positions of the dot-on pixels of the respective size dots, and creates the respective size dots to print a result image on the printing paper. The following describes the procedure of determining the positions of the dot-on pixels of the respective size dots according to the dot number data.

Figure 27:
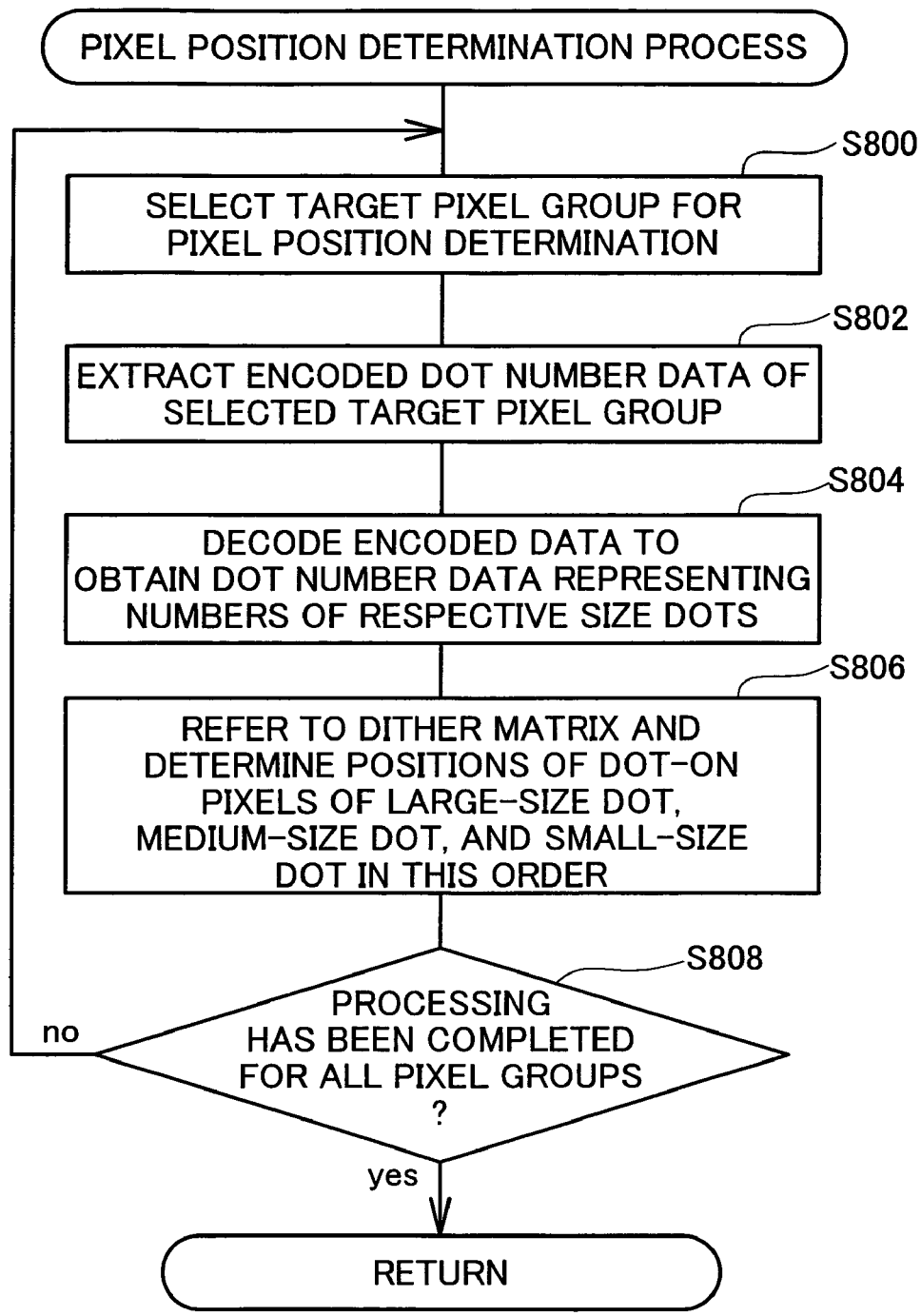
FIG. 27 is a flowchart showing the details of a pixel position determination process executed in the third embodiment.

FIG. 27 is a flowchart showing the details of the pixel position determination process in the third embodiment executed by the CPU of the control circuit 260 in the printer 200.

The pixel position determination process of the third embodiment first selects a target pixel group as an object of pixel position determination (step S800) and extracts data of the selected target pixel group from the transferred data (step S802). The dot number data have been encoded prior to transfer as mentioned previously in relation to FIG. 25. The process accordingly decodes the encoded data to the dot number data representing the numbers of the respective size dots to be created in the target pixel group (step S804).

The method refers to the conversion table shown in FIG. 25 and obtains the decoded data corresponding to the code number. For example, when the encoded data is '162', the dot numbers corresponding to the code number '162' are read from the conversion table. Namely the encoded data '162' is decoded to the dot number data representing seven large-size dots, zero medium-size dot, and one small-size dot.

After obtaining the decoded dot number data representing the numbers of the respective size dots, the process refers to a dither matrix to determine the positions of the dot-on pixels of the respective size dots (step S806). The concrete procedure of determination is discussed below with reference to FIG. 28.

Figure 28:
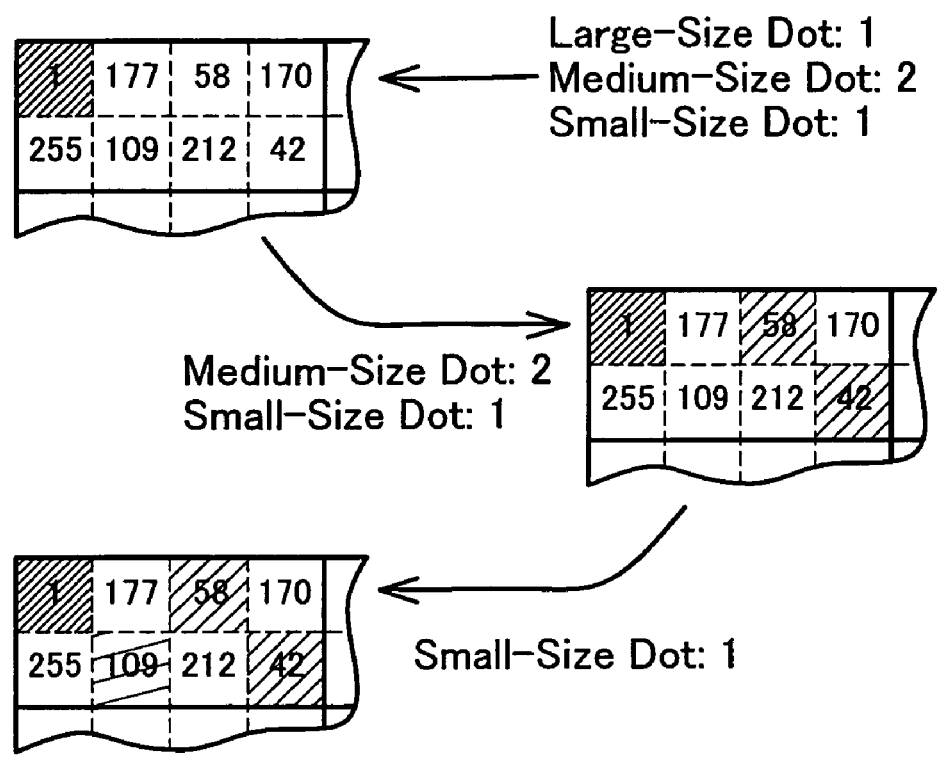
FIG. 28 shows a process of determining the positions of dot-on pixels of the respective size dots according to the dot number data in the pixel position determination process of the third embodiment.

FIG. 28 shows a process of determining the positions of the dot-on pixels of the respective size dots according to given dot number data of the respective size dots in one pixel group by referring to the dither matrix. Each rectangle of the thick solid line represents one pixel group, and the divisions of the pixel group by the thin broken lines represent multiple pixels constituting the pixel group. The numeral shown in each pixel is a threshold value set at the corresponding position in the dither matrix. The dither matrix used here is identical with the dither matrix used for determination of the numbers of the respective size dots.

In this illustrated example, it is assumed that one large-size dot, two medium-size dots, and one small-size dot are to be created in the pixel group. The method first determines the positions of the large-size dot-on pixels. As mentioned previously, the threshold values in the dither matrix show the potential for dot formation. One large-size dot is thus to be created in the pixel having the smallest threshold value. The method determines the positions of the medium-size dot-on pixels after determination of the positions of the large-size dot-on pixels. Two medium-size dots are to be created, while the pixel having the smallest threshold value has already been set for formation of the large-size dot. Two medium-size dots are thus to be created in the pixels having the second smallest threshold value and the third smallest threshold value. The method determines the positions of the small-size dot-on pixels after determination of the positions of the medium-size dot-on pixels. One small-size dot is to be created, while the pixels having the smallest, the second smallest, and the third smallest threshold values have already been set for formation of the large-size dot and the medium-size dot. One small-size dot is thus to be created in the pixel having the fourth smallest threshold value.

In the illustrated example of FIG. 28, the positions of the dot-on pixels are determined in the order of the large-size dot, the medium-size dot, and the small-size dot. The pixel filled with dense slant lines denotes the pixel set for formation of a large-size dot. The pixels filled with slant lines denote the pixels set for formation of medium-size dots. The pixel filled with sparse slant lines denotes the pixel set for formation of a small-size dot. The process refers to the dither matrix and determines the positions of the dot-on pixels with regard to the respective size dots at step S806 in the flowchart of FIG. 27.

After determination of the positions of the dot-on pixels with regard to the respective size dots in one pixel group, the process determines whether the pixel position determination has been completed for the data of all the pixel groups received from the computer 100 (step S808). When there is any unprocessed pixel group (step S808: No), the process returns to step S800 to set a next pixel group and repeats the subsequent series of processing. When the dot-on pixel positions have been determined for all the pixel groups (step S808: Yes), the program terminates the pixel position determination process of FIG. 27 and goes back to the image printing routine. The printer 200 then creates the respective size dots on the printing paper to print a resulting processed image according to the image data.

The image printing process of the third embodiment discussed above is effectively applied to the printer 200 as the multi-valued printer. The printer 200 receives the dot number data of the respective size dots transferred from the computer 100 and prints a resulting processed image according to the transferred data. This arrangement attains quicker data transfer, compared with the method of transferring the dot state data representing the dot on-off state of the individual pixels. Even when an image includes a large number of pixels, the procedure of the third embodiment thus ensures high-speed image printing.

E. Modifications

The technique of the invention is not restricted to the embodiments or their modified examples discussed above. There may be diversity of other modifications. Some examples of possible modification are described briefly below.

(1) First Modified Example

The number data generation process in any of the above embodiments applies the dither method to determine the dot on-off state. Any other technique may alternatively be adopted for determination of the dot number to attain the adequate density according to the tone values of the image data.

Figure 30:
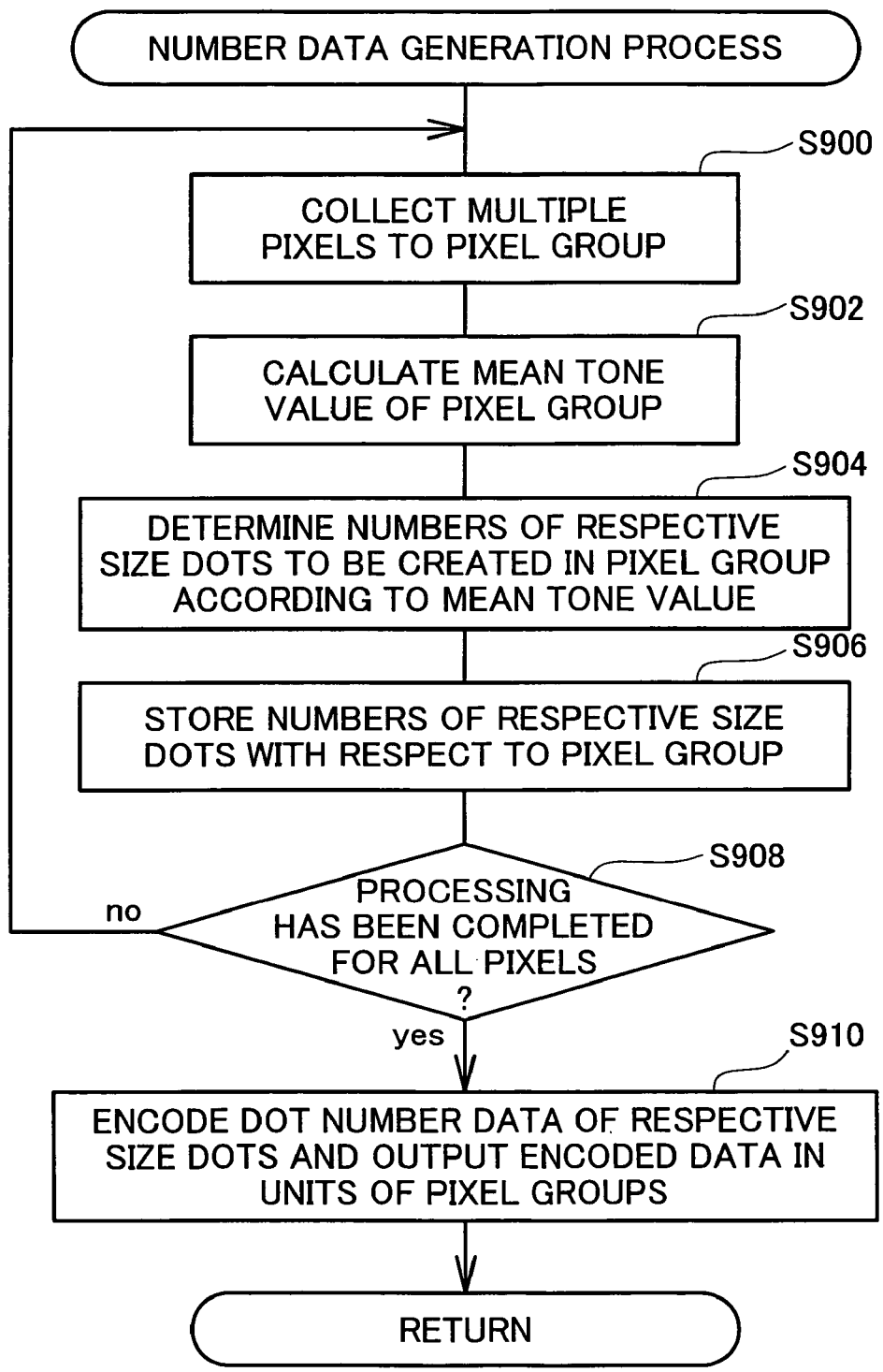
FIG. 30 is a flowchart showing the details of a number data generation process executed in an image printing process of a first modified example.

For example, one modified example may adopt a number data generation process shown in FIG. 30 to calculate a mean tone value of respective pixels included in each pixel group and unequivocally determine the numbers of respective size dots to be created in the pixel group according to the calculated mean tone value. The procedure of this modified example is briefly described with reference to the flowchart of FIG. 30.

Figure 31:
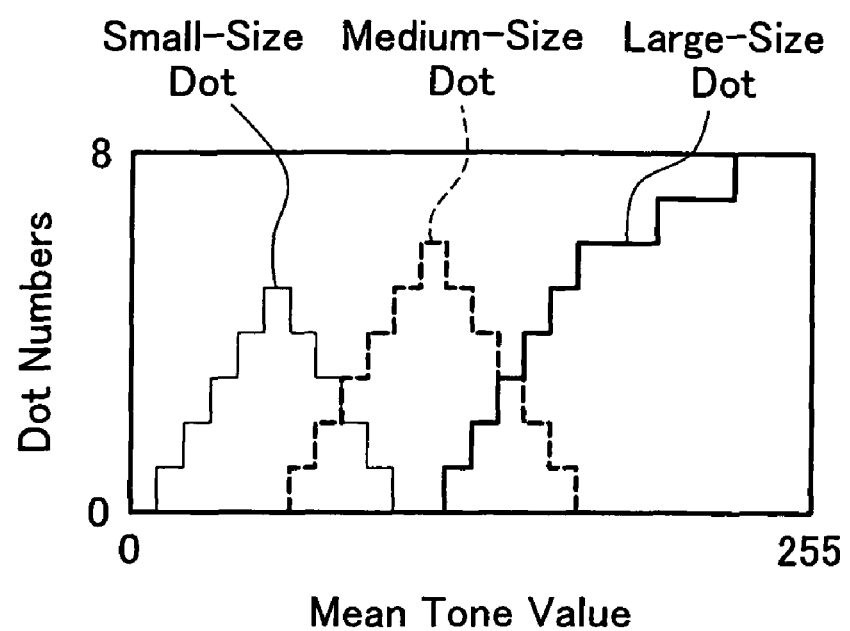
FIG. 31 shows a process of unequivocally determining the numbers of respective size dots according to a mean tone value in each pixel group.

The number data generation process of this modified example first collects a predetermined number of multiple pixels to one pixel group (step S900) and calculates a mean tone value of the respective pixels included in the pixel group (step S902). The process then unequivocally determines the numbers of the respective size dots to be created in the pixel group according to the calculated mean tone value. A concrete procedure sets variations in numbers of the respective size dots to be created in one pixel group against the mean tone value as shown in the map of FIG. 31. The procedure reads the numbers of the respective size dots corresponding to the given mean tone value of the pixel group from this map. The map of FIG. 31 shows the variations in numbers of the three different size dots, but there may be a greater or less number of variable-size dots.

The process stores the determined numbers of the respective size dots with respect to the pixel group (step S906) and determines whether the processing has been completed for all the pixels (step S908). When there is any unprocessed pixel, the process returns to step S900 and repeats the subsequent series of processing. When the processing of all the pixels has been completed, on the other hand, the process encodes the stored numbers of the respective size dots according to the method of FIG. 29 discussed above and outputs the encoded dot number data to the printer 200 (step S910).

The printer 200 receives the dot number data output from the computer 100 and executes the pixel position determination process discussed above to print a resulting processed image. The procedure of this modified example readily generates the dot number data with regard to each pixel group. This arrangement ensures quick output of the dot number data and thereby high-speed image printing.

(2) Second Modified Example

In any of the above embodiments, the number data generation process first collects a predetermined number of multiple pixels to one pixel group and then determines the number of dots to be created in the pixel group. One modified procedure may first determine the dot on-off state of individual pixels and then collect every predetermined number of multiple pixels to one pixel group.

Figure 32:
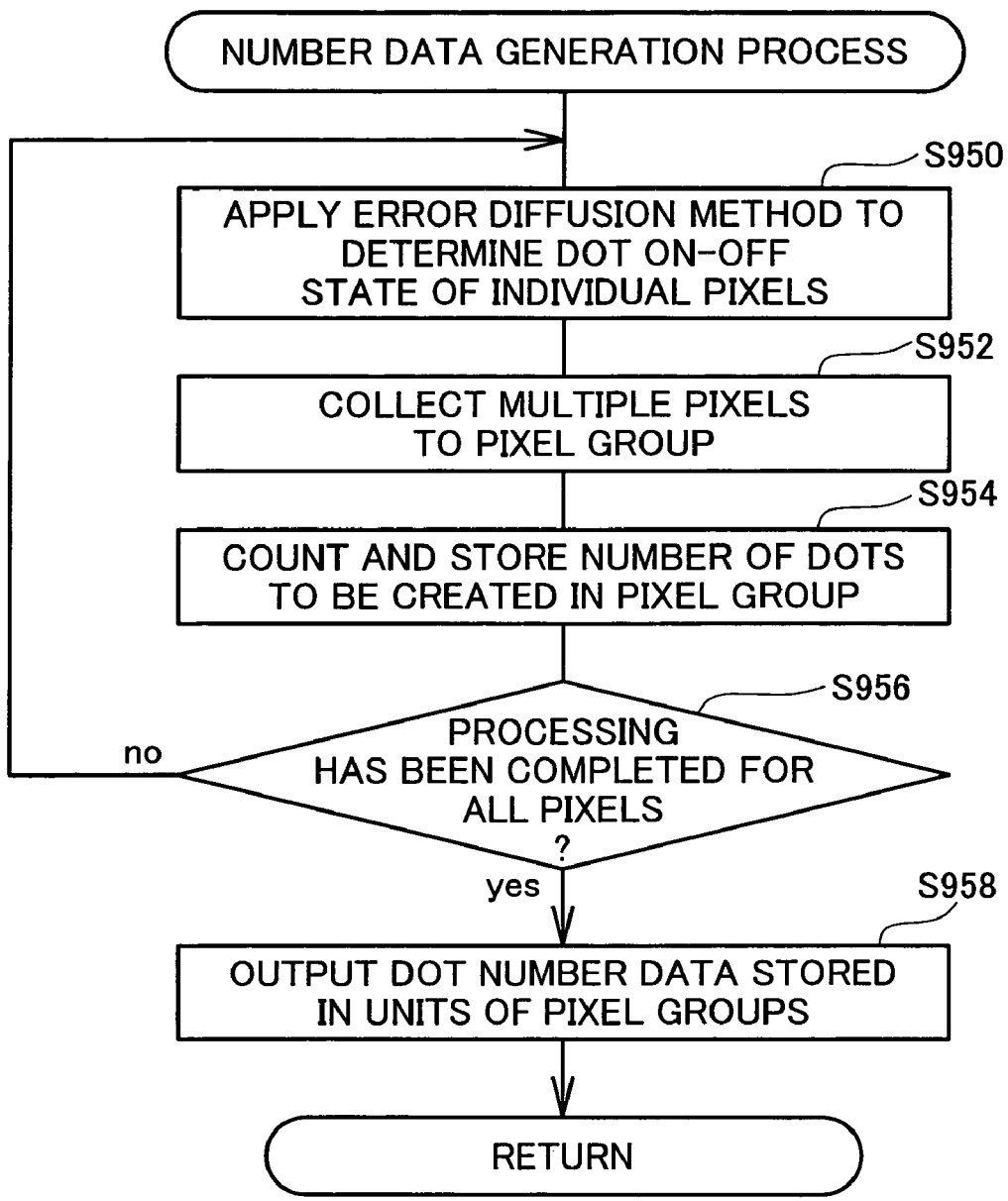
FIG. 32 is a flowchart showing the details of a number data generation process executed in an image printing process of a second modified example.

For example, a modified process shown in the flowchart of FIG. 32 applies an error diffusion method to determine the dot on-off state of all the pixels included in the input image data (step S950). The modified process then collects a predetermined number of multiple pixels to one pixel group (step S952), and counts and stores the number of dots to be created in the pixel group (step S954).

After storage of the dot number data with regard to one pixel group, the process determines whether the processing has been completed for all the pixels (step S956). When there is any unprocessed pixel, the process goes back to step S900 and repeats the above series of processing. When the processing of all the pixels has been completed, on the other hand, the process outputs the dot number data stored in units of pixel groups to the printer 200 (step S958).

The printer 200 receives the dot number data output from the computer 100 and executes the pixel position determination process described above to determine the positions of the dot-on pixels in each pixel group. The modified procedure of FIG. 32 adopts the error diffusion method for determination of the number of dots to be created in each pixel group. This procedure may refer to the dither matrix to determine the positions of the dot-on pixels.

As is known in the art, application of the error diffusion method to determine the dot on-off state gives the substantially noise-free, good picture quality in an area of the low dot formation density. The error diffusion method is especially effective for printing an image of the low dot formation density, for example, where pixel groups with dot formation are sparsely distributed among a large number of pixels groups with no dot formation. Determination of the number of dots to be created in each pixel group according to the error diffusion method enables the dots to be adequately distributed and gives a high-quality resulting image.

(3) Third Modified Example

Any of the embodiments discussed above determines the positions of the dot-on pixels by referring to the dither matrix. The method of using the priority order matrix for the pixel position determination does not directly refer to the dither matrix but indirectly uses the dither matrix to determine the positions of the dot-on pixels, since the priority order matrix is prepared corresponding to the dither matrix. Such dependence on the dither matrix is, however, not essential as long as the positions of the dot-on pixels are determinable with different settings of the priority order to the respective pixel groups.

Figure 33:
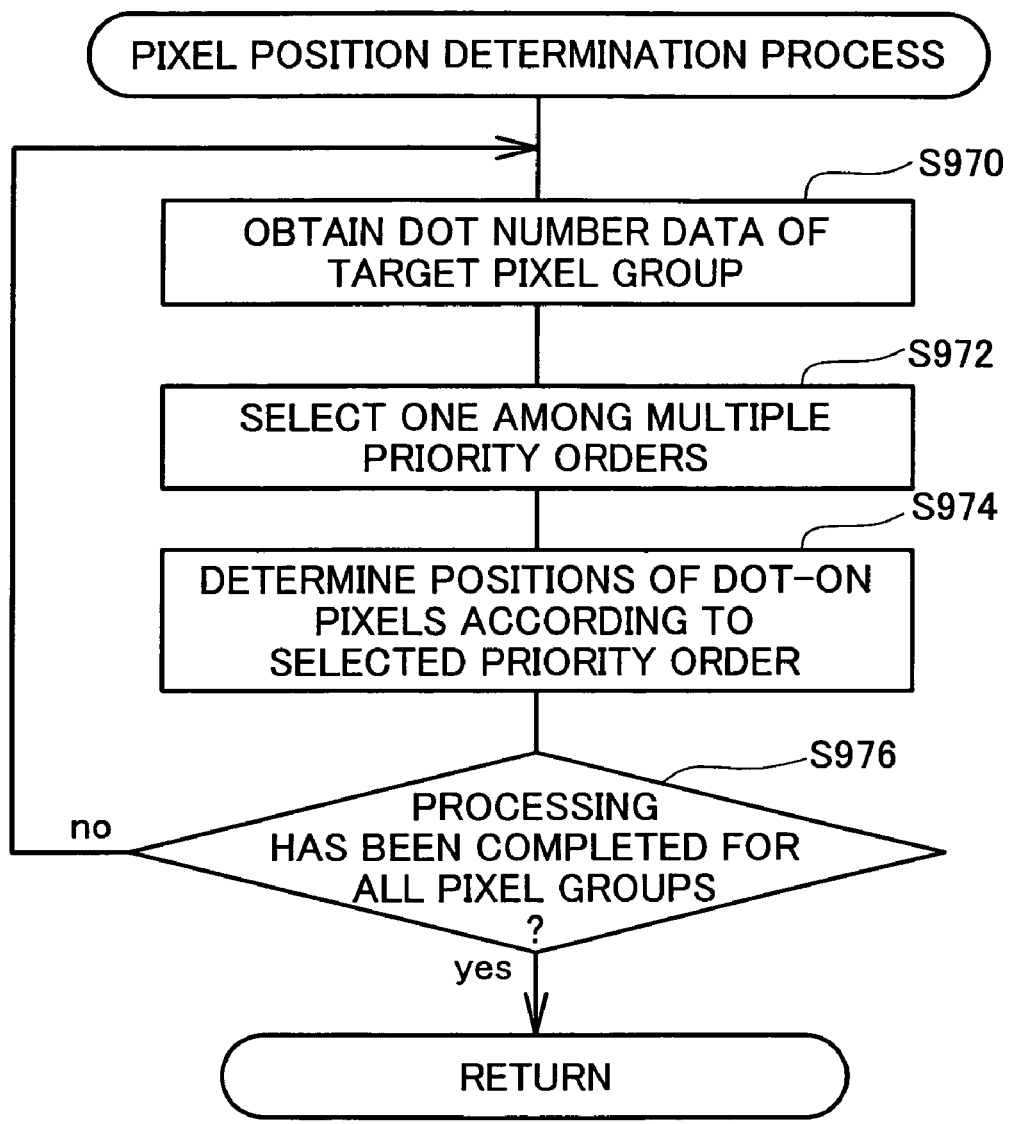
FIG. 33 is a flowchart showing the details of a pixel position determination process executed in an image printing process of a third modified example.

For example, a modified process shown in the flowchart of FIG. 33 stores multiple priority orders and selects an arbitrary priority order for each pixel group among the stored multiple priority orders to determine the positions of the dot-on pixels. The procedure of this modified example is briefly described with reference to the flowchart of FIG. 33.

Figure 34:
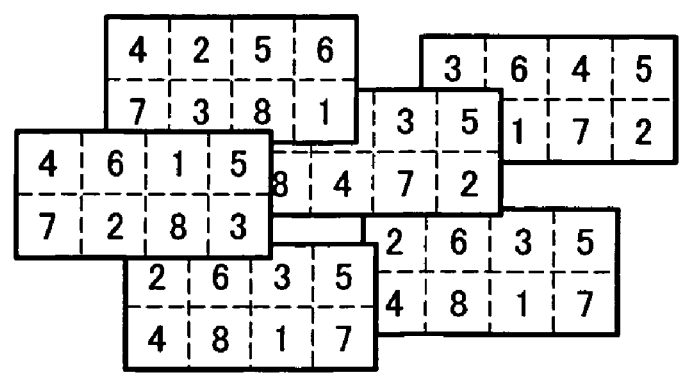
FIG. 34 shows storage of multiple priority orders for individual pixels included in each pixel group.

When the pixel position determination process of this modified example starts, the CPU of the control circuit 260 in the printer 200 first selects a target pixel group as an object of the pixel position determination and obtains the dot number data of the selected target pixel group (step S970). The process then selects arbitrary one among multiple priority orders stored in advance (step S972). The multiple priority orders of respective pixels in each pixel group have been stored in the ROM of the control circuit 260. FIG. 34 shows multiple priority orders stored in the ROM. The process selects one of the multiple priority orders at step S972.

The process refers to the selected priority order and determines the positions of the dot-on pixels in the target pixel group (step S974). After determination of the positions of the dot-on pixels in one pixel group, the process determines whether the processing has been completed for all the pixel groups (step S976). When there is any unprocessed pixel group, the process goes back to step S970 and repeats the above series of processing to determine the positions of the dot-on pixels in a next target pixel group. This series of processing is repeated until the processing of all the pixel groups has been completed.

The procedure of this modified example determines the positions of the dot-on pixels according to the dot number data of each pixel group. Different priority orders are generally selected for the individual pixel groups to be referred to for determination of the positions of the dot-on pixels. This arrangement prevents dot formation in an identical pattern and thus desirably avoids potential deterioration of the picture quality.

The embodiments and their modified examples discussed above are to be considered in all aspects as illustrative and not restrictive. There may be many other modifications, changes, and alterations without departing from the scope or spirit of the main characteristics of the present invention. For example, the software programs (application programs) that attain the diverse functions discussed above may be supplied to the main memory of the computer system or to an external storage device via a communication line and be executed by the computer system. The software programs may otherwise be read from CD-ROMs or flexible disks to be executed.

The embodiments and the modified examples discussed above regard the printers that create dots to print an image on printing paper. The technique of the invention is, however, not restricted to the printers but is also effectively applicable to liquid crystal display devices that disperse luminescent spots at an adequate density on a liquid crystal display screen to express an image of continuously varying tone.

I claim:

1. An image output control system comprising an image processing device that makes image data subjected to a preset series of image processing and an image output device that creates dots according to a result of the preset series of image processing to output an image, said image processing device comprising:
a pixel group setting module that collects a predetermined number of plural pixels, among a large number of pixels constituting the image, to each pixel group;
a dot number specification module that causes image data of respective pixels in each pixel group to be represented uniformly by preset representative image data and specifies number of dots to be created in each pixel group according to the representative image data; and
a number data output module that outputs dot number data representing the specified number of dots with regard to each pixel group to said image output device, said image output device comprising:
a number data receiving module that receives the output dot number data with regard to each pixel group;
a priority order specification module that specifies a priority order of pixels for dot formation in each pixel group;
a pixel position determination module that determines position of each dot-on pixel included in each pixel group, based on the received dot number data and the specified priority order; and
a dot formation module that actually creates a dot at the determined position of each dot-on pixel;

wherein said dot number specification module comprises:
a mapping storage module that stores multiple threshold value sequences, each consisting of plural threshold values corresponding to the predetermined number of plural pixels included in each pixel group, as multiple mappings for conversion of the representative image data of each pixel group into the number of dots to be created in the pixel group; and
a mapping selection module that selects one threshold value sequence among the stored multiple threshold value sequences as one mapping for each pixel group among the stored multiple mappings;
said dot number specification module specifying a number of smaller threshold values in the selected threshold value sequence that are smaller than the image data of each pixel group, as the number of dots to be created in each pixel group, based on the representative image data of the pixel group and the selected mapping;
said mapping storage module storing the plural threshold values of each threshold value sequence together with information on an order of magnitude of the respective threshold values in the threshold value sequence; and
said dot number specification module referring to the order of magnitude and comparing the image data of each pixel group with the plural threshold values of the selected threshold value sequence, so as to specify the number of dots to be created in the pixel group.

2. An image output control system in accordance with claim 1, wherein said image processing device further comprises:
a pixel number increase module that processes each original pixel of the image to generate multiple pixels having identical image data with image data of the original pixel, so as to increase a total number of pixels in the image,
wherein said pixel group setting module collects the multiple pixels generated from an identical original pixel to one pixel group.

3. An image output control system in accordance with claim 1, wherein said priority order specification module selects one priority order for each pixel group, among multiple priority orders prepared in advance.

4. An image output control system in accordance with claim 1, wherein said mapping storage module stores the plural threshold values of each threshold value sequence arranged in the order of magnitude as storage of the information on the order of magnitude.

5. An image output control system in accordance with either one of claims 1 and 4, wherein when the image data of one pixel group is greater than a preset first threshold value, said dot number specification module performs comparison with the image data of the pixel group in a descending order of the plural threshold values of the selected threshold value sequence, so as to specify the number of dots to be created in the pixel group.

6. An image output control system in accordance with either one of claims 1 and 4, wherein when the image data of one pixel group is smaller than a preset second threshold value, said dot number specification module performs comparison with the image data of the pixel group in an ascending order of the plural threshold values of the selected threshold value sequence, so as to specify the number of dots to be created in the pixel group.

7. An image output control system in accordance with claim 1, wherein said dot number specification module start comparison between the image data of each pixel group and the plural threshold values of the selected threshold value sequence from a threshold value having a selected ordinal number corresponding to a most recently specified dot number, so as to specify the number of dots to be created in the pixel group.

8. An image output control system in accordance with claim 1, wherein said mapping storage module stores a simplified dither matrix that includes the multiple threshold value sequences arranged in a preset two-dimensional array, as the multiple mappings,
said mapping selection module selects one threshold value sequence corresponding to a position of each pixel group in the image, among the multiple threshold value sequences stored in the simplified dither matrix, and
said dot number specification module specifies the number of dots to be created in each pixel group, based on comparison between the image data of the plural pixels included in the pixel group and the corresponding plural threshold values of the selected threshold value sequence.

9. An image output control system in accordance with claim 8, wherein said priority order specification module comprises:
   a priority order storage module that stores a priority order matrix including the multiple priority orders of pixels for dot formation in each pixel group in a preset two-dimensional array, and
   the simplified dither matrix and the priority order matrix have an identical number of rows and an identical number of columns expressed by the number of pixels.

10. An image output control system in accordance with claim 8, wherein said mapping storage module stores the simplified dither matrix that is generated by dividing a dither matrix, which maps threshold values to respective pixels arranged in a two-dimensional array, into multiple groups corresponding to multiple pixel groups and includes the multiple threshold value sequences arranged corresponding to the multiple groups, and
   said priority order specification module comprises:
   a priority order storage module that stores a priority order matrix that is generated by dividing the dither matrix into the multiple groups corresponding to the multiple pixel groups and includes the multiple priority orders arranged corresponding to the multiple groups, where the priority order is specified with regard to each pixel group based on a magnitude order of respective threshold values included in a corresponding group; and
   a priority order selection module that selects one priority order corresponding to a position of each pixel group in the image, among the multiple priority orders stored in the priority order matrix.

11. An image processing device that causes input image data representing an image to go through a preset series of image processing and thereby generates control data, which is used for control of dot formation by an image output device that creates dots and outputs a resulting processed image, said image processing device comprising:
   a pixel group setting module that collects a predetermined number of plural pixels, among a large number of pixels constituting the image, to each pixel group;
   a dot number specification module that causes image data of respective pixels in each pixel group to be represented uniformly by preset representative image data and specifies number of dots to be created in each pixel group according to the representative image data; and
   a number data output module that outputs dot number data representing the specified number of dots with regard to each pixel group as the control data to said image output device;
   wherein said dot number specification module comprises:
   a mapping storage module that stores multiple threshold value sequences, each consisting of plural threshold values corresponding to the predetermined number of plural pixels included in each pixel group, as multiple mappings for conversion of the representative image data of each pixel group into the number of dots to be created in the pixel group; and
   a mapping selection module that selects one threshold value sequence among the stored multiple threshold value sequences as one mapping for each pixel group among the stored multiple mappings;
   said dot number specification module specifying a number of smaller threshold values in the selected threshold value sequence that are smaller than the image data of each pixel group, as the number of dots to be created in each pixel group, based on the representative image data of the pixel group and the selected mapping;
   said mapping storage module storing the plural threshold values of each threshold value sequence together with information on an order of magnitude of the respective threshold values in the threshold value sequence; and
   said dot number specification module referring to the order of magnitude and comparing the image data of each pixel group with the plural threshold values of the selected threshold value sequence, so as to specify the number of dots to be created in the pixel group.

12. An image processing device in accordance with claim 11, said image processing device further comprising:
   a pixel number increase module that processes each original pixel of the image to generate multiple pixels having identical image data with image data of the original pixel, so as to increase a total number of pixels in the image,
   wherein said pixel group setting module collects the multiple pixels generated from an identical original pixel to one pixel group.

13. An image processing device in accordance with claim 11, wherein said dot number specification module comprises:
   a mapping storage module that stores multiple mappings for conversion of the representative image data of each pixel group into the number of dots to be created in the pixel group; and
   a mapping selection module that selects one mapping for each pixel group among the stored multiple mappings,
   said dot number specification module specifying the number of dots to be created in each pixel group, based on the representative image data of the pixel group and the selected mapping.

14. An image output control method that makes image data subjected to a preset series of image processing and creates dots according to a result of the preset series of image processing to output an image,
   said image output control method comprising:
   a first step of collecting a predetermined number of plural pixels, among a large number of pixels constituting the image, to each pixel group;
   a second step of causing image data of respective pixels in each pixel group to be represented uniformly by preset representative image data and specifying number of dots to be created in each pixel group according to the representative image data;
   a third step of specifying a priority order of pixels for dot formation in each pixel group;
   a fourth step of determining position of each dot-on pixel included in each pixel group, based on the specified number of dots and the specified priority order; and
   a fifth step of actually creating a dot at the determined position of each dot-on pixel;
   wherein said second step comprises:
   a mapping storage step of storing multiple threshold value sequences, each consisting of plural threshold values corresponding to the predetermined number of plural pixels included in each pixel group, as multiple mappings for conversion of the representative image data of each pixel group into the number of dots to be created in the pixel group; and
   a mapping selection step of selecting one threshold value sequence among the stored multiple threshold value sequences as one mapping for each pixel group among the stored multiple mappings;

said second step specifying a number of smaller threshold values in the selected threshold value sequence that are smaller than the image data of each pixel group, as the number of dots to be created in each pixel group, based on the representative image data of the pixel group and the selected mapping;

said mapping storage step storing the plural threshold values of each threshold value sequence together with information on an order of magnitude of the respective threshold values in the threshold value sequence; and said second step referring to the order of magnitude and comparing the image data of each pixel group with the plural threshold values of the selected threshold value sequence, so as to specify the number of dots to be created in the pixel group.

15. An image output control method in accordance with claim 14, wherein said first step comprises the step of:
processing each original pixel of the image to generate multiple pixels having identical image data with image data of the original pixel, so as to increase a total number of pixels in the image.

16. A tangible computer-readable medium storing an image output control program that is executed by a computer to make image data subjected to a preset series of image processing, create dots according to a result of the preset series of image processing, and thereby output an image,
said image output control program causing the computer to execute:
a first function of collecting a predetermined number of plural pixels, among a large number of pixels constituting the image, to each pixel group;
a second function of causing image data of respective pixels in each pixel group to be represented uniformly by preset representative image data and specifying number of dots to be created in each pixel group according to the representative image data;
a third function of specifying a priority order of pixels for dot formation in each pixel group;
a fourth function of determining position of each dot-on pixel included in each pixel group, based on the specified number of dots and the specified priority order; and
a fifth function of actually creating a dot at the determined position of each dot-on pixel;
wherein said second function comprises:
a mapping storage function of storing multiple threshold value sequences, each consisting of plural threshold values corresponding to the predetermined number of plural pixels included in each pixel group, as multiple mappings for conversion of the representative image data of each pixel group into the number of dots to be created in the pixel group; and
a mapping selection function of selecting one threshold value sequence among the stored multiple threshold value sequences as one mapping for each pixel group among the stored multiple mappings;
said second function specifying a number of smaller threshold values in the selected threshold value sequence that are smaller than the image data of each pixel group, as the number of dots to be created in each pixel group, based on the representative image data of the pixel group and the selected mapping;
said mapping storage function storing the plural threshold values of each threshold value sequence together with information on an order of magnitude of the respective threshold values in the threshold value sequence; and
said second function referring to the order of magnitude and comparing the image data of each pixel group with the plural threshold values of the selected threshold value sequence, so as to specify the number of dots to be created in the pixel group.

17. A tangible computer-readable medium in accordance with claim 16, wherein said first function comprises the function of:
processing each original pixel of the image to generate multiple pixels having identical image data with image data of the original pixel, so as to increase a total number of pixels in the image.

18. An image output control system comprising an image processing device that makes image data subjected to a preset series of image processing and an image output device that creates dots according to a result of the preset series of image processing to output an image,
said image processing device comprising:
a generator that collects a predetermined number of plural pixels, among a large number of pixels constituting the image, to each pixel group;
a number specification unit that causes image data of respective pixels in each pixel group to be represented uniformly by preset representative image data and specifies number of dots to be created in each pixel group according to the representative image data; and
a data transmitter that outputs dot number data representing the specified number of dots with regard to each pixel group to said image output device,
said image output device comprising:
a data receiver that receives the output dot number data with regard to each pixel group;
a selector that selects a priority order of pixels for dot formation in each pixel group;
an operator that determines position of each dot-on pixel included in each pixel group, based on the received dot number data and the selected priority order; and
a dot formation unit that actually creates a dot at the determined position of each dot-on pixel;
wherein said number specification unit comprises:
a memory that stores multiple threshold value sequences, each consisting of plural threshold values corresponding to the predetermined number of plural pixels included in each pixel group, as multiple mappings for conversion of the representative image data of each pixel group into the number of dots to be created in the pixel group; and
a selector that selects one threshold value sequence among the stored multiple threshold value sequences as one mapping for each pixel group among the stored multiple mappings;
said number specification unit specifying a number of smaller threshold values in the selected threshold value sequence that are smaller than the image data of each pixel group, as the number of dots to be created in each pixel group, based on the representative image data of the pixel group and the selected mapping;
said memory storing the plural threshold values of each threshold value sequence together with information on an order of magnitude of the respective threshold values in the threshold value sequence; and
said number specification unit referring to the order of magnitude and comparing the image data of each pixel group with the plural threshold values of the selected threshold value sequence, so as to specify the number of dots to be created in the pixel group.

* * * * *